US011729491B2

(12) United States Patent
Kamba

(10) Patent No.: US 11,729,491 B2
(45) Date of Patent: Aug. 15, 2023

(54) IMAGING APPARATUS, CONTROL METHOD FOR IMAGING APPARATUS, AND STORAGE MEDIUM

(71) Applicant: CANON KABUSHIKI KAISHA, Tokyo (JP)

(72) Inventor: Masaki Kamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/855,426

(22) Filed: Jun. 30, 2022

(65) Prior Publication Data

US 2023/0007164 A1 Jan. 5, 2023

(30) Foreign Application Priority Data

Jul. 2, 2021 (JP) ................................. 2021-110503

(51) Int. Cl.
*H04N 23/62* (2023.01)
*H04N 23/76* (2023.01)
*H04N 23/617* (2023.01)
*H04N 23/67* (2023.01)

(52) U.S. Cl.
CPC ........... *H04N 23/62* (2023.01); *H04N 23/617* (2023.01); *H04N 23/675* (2023.01); *H04N 23/76* (2023.01)

(58) Field of Classification Search
CPC ........ H04N 23/73; H04N 23/62; H04N 23/69; H04N 23/75; H04N 23/617; H04N 23/76; H04N 23/675; H04N 23/695
USPC .................................................... 348/207.99
See application file for complete search history.

(56) References Cited

U.S. PATENT DOCUMENTS

| 9,158,974 | B1* | 10/2015 | Laska | H04N 23/667 |
| 9,213,903 | B1* | 12/2015 | Laska | G06V 10/235 |
| 10,007,975 | B2* | 6/2018 | Nakata | G06F 3/0484 |
| 10,372,576 | B2* | 8/2019 | Suzuki | G06F 11/3612 |
| 10,514,996 | B2* | 12/2019 | Suzuki | G06F 9/455 |
| 11,089,209 | B2* | 8/2021 | Honjo | H04N 23/69 |
| 11,558,585 | B2* | 1/2023 | Imes | G06V 10/10 |
| 2006/0104625 | A1* | 5/2006 | Oya | H04N 23/695 396/428 |
| 2009/0175501 | A1* | 7/2009 | Tahara | H04N 7/147 382/103 |
| 2015/0356715 | A1* | 12/2015 | Nakata | G06F 1/1643 715/719 |

(Continued)

FOREIGN PATENT DOCUMENTS

JP 5661345 B2 1/2015

*Primary Examiner* — Pritham D Prabhakher
(74) *Attorney, Agent, or Firm* — Canon U.S.A., Inc. IP Division

(57) ABSTRACT

A system control unit controls an action regarding imaging by an imaging unit according to an instruction from a user. The system control unit automatically controls the action regarding the imaging by the imaging unit based on a preset condition. The system control unit chronologically records details of the control of the action of the imaging unit according to the instruction from the user as operation information. The system control unit chronologically records details of the automatic control of the action of the imaging unit as change information. The system control unit plays back the chronological details of the control of the action of the imaging unit based on the recorded operation information and change information.

13 Claims, 15 Drawing Sheets

(56) References Cited

U.S. PATENT DOCUMENTS

| | | | |
|---|---|---|---|
| 2016/0012609 A1* | 1/2016 | Laska | H04N 23/632 |
| | | | 382/103 |
| 2016/0041724 A1* | 2/2016 | Kirkby | G06V 20/40 |
| | | | 715/719 |
| 2017/0041530 A1* | 2/2017 | Kimura | H04N 23/698 |
| 2017/0366743 A1* | 12/2017 | Park | G06F 3/04883 |
| 2019/0057020 A1* | 2/2019 | Suzuki | G06F 11/3457 |
| 2019/0243967 A1* | 8/2019 | Sonoda | G06F 21/55 |
| 2021/0092289 A1* | 3/2021 | Honjo | H04N 23/695 |
| 2021/0120170 A1* | 4/2021 | Imamiya | H04N 23/672 |
| 2021/0329184 A1* | 10/2021 | Watanabe | H04N 23/74 |

* cited by examiner

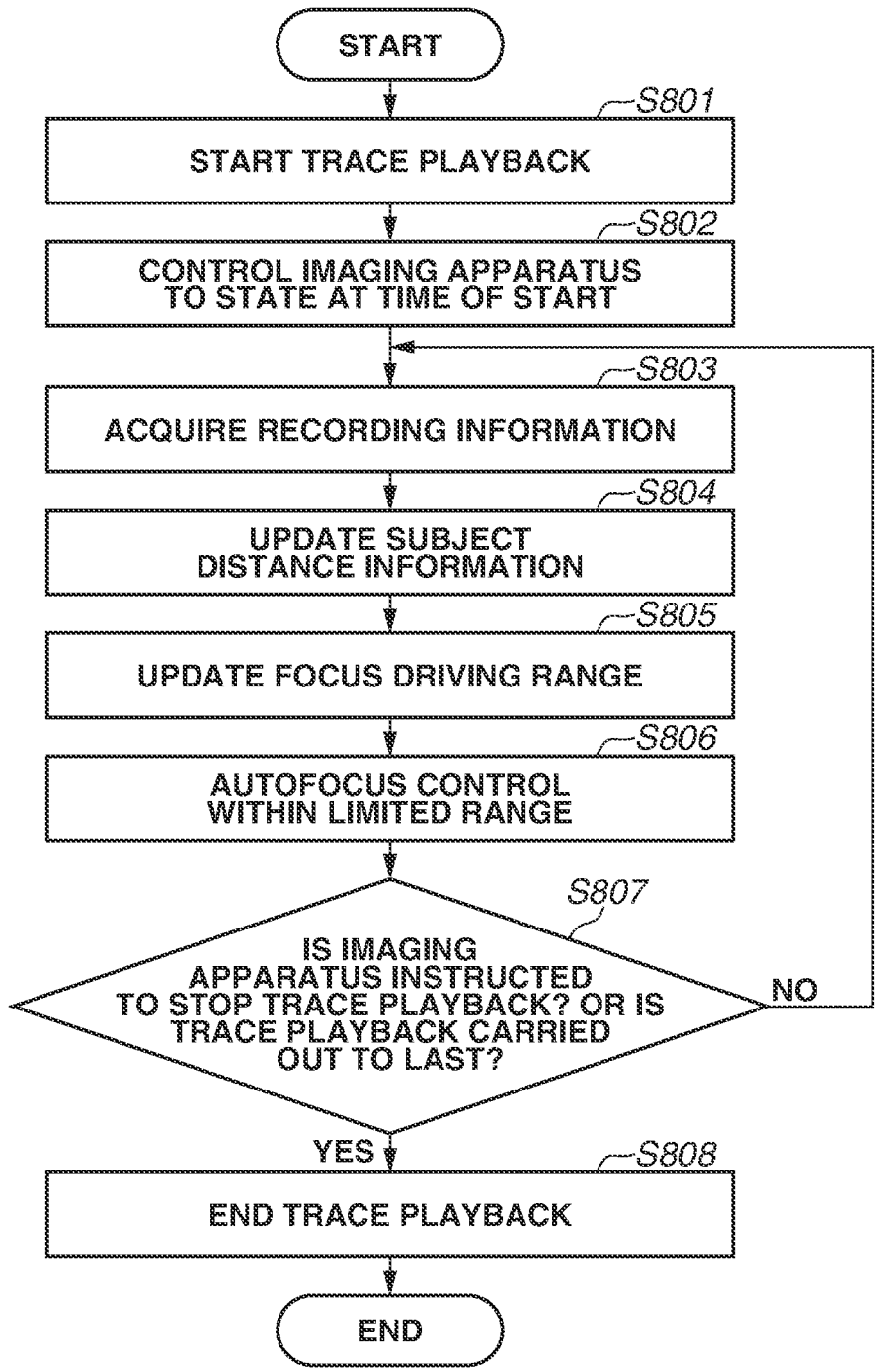

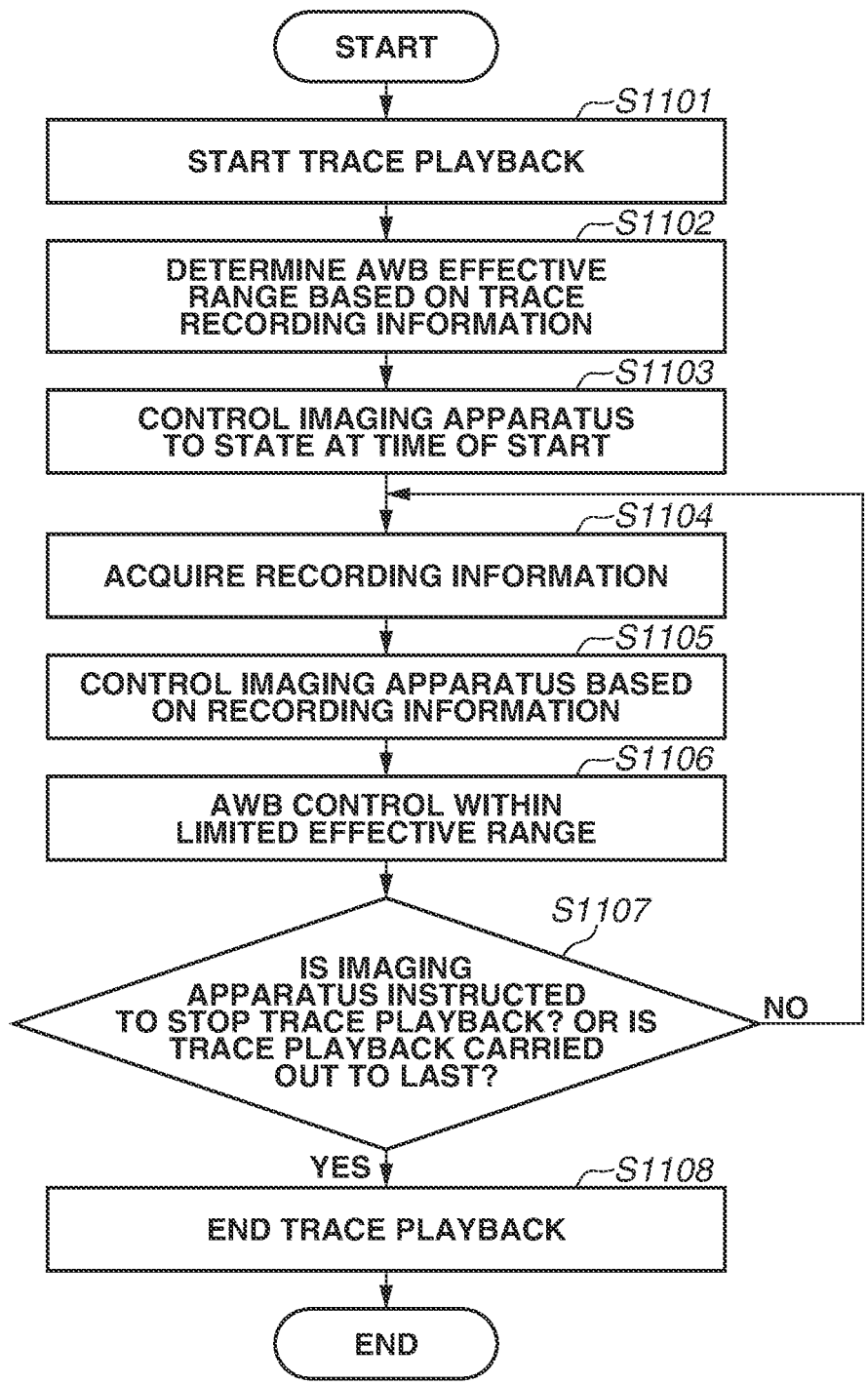

AWB REGION AT TIME OF TRACE RECORDING

AWB REGION AT TIME OF TRACE PLAYBACK

IMAGING APPARATUS, CONTROL METHOD FOR IMAGING APPARATUS, AND STORAGE MEDIUM

BACKGROUND OF THE DISCLOSURE

Field of the Disclosure

The present disclosure relates to an imaging apparatus, a control method for an imaging apparatus, and a storage medium.

Description of the Related Art

The expansion of the video streaming market in recent years has led to various proposals of systems allowing an event such as a wedding ceremony and a lecture meeting to be imaged using an imaging apparatus capable of capturing a moving image under remote control via a network (e.g., a network camera). In particular, there have also been proposed imaging apparatuses configured in such a manner that the installation of an application into a mobile terminal such as a smart-phone, a personal computer (PC), or the like enables the imaging apparatus to be remotely operated from the mobile terminal, the PC, or the like. Examples of this remote operation include a pan/tilt/zoom (PTZ) operation for operating panning, tilting, and zooming of the imaging apparatus. Among imaging apparatuses configured in this manner, there have also been proposed imaging apparatuses equipped with a presetting function of controlling the imaging apparatus so as to satisfy a preset angle of view and a trace function of recording information about an operation received from a user in advance to thereby reproduce an action based on this operation later. Japanese Patent No. 5661345 discusses an example of a technique for realizing the trace function in a camera platform system that allows an operation regarding pan/tilt/zoom and focus control to be performed.

In contrast, some imaging apparatuses have a function of automatically controlling an action regarding imaging according to a moment-to-moment situation based on preset conditions. In such an imaging apparatus, the conditions regarding imaging may be determined under the control according to the operation received from the user and the automatic control. Under such a situation, for example, even when the information about the operation received from the user is recorded, it may be difficult to reproduce the action regarding imaging performed when this operation has been carried out based on the information.

SUMMARY OF THE DISCLOSURE

In order to enable the previously performed action to be reproduced later in a further suitable manner even under a situation that the action regarding imaging is automatically controlled, an imaging apparatus includes a processor executing instructions that, when executed, cause the processor to function as a first control unit configured to control an action regarding an imaging unit according to an instruction from a user, a second control unit configured to automatically control an action regarding the imaging unit based on a preset condition, a first recording unit configured to chronologically record, as first information, details of the control of the action of the imaging unit according to the instruction from the user, a second recording unit configured to chronologically record, as second information, details of the automatic control of the action of the imaging unit based on the condition, in association with the first information, and a playback unit configured to play back chronological details of the control of the action of the imaging unit based on the first information and the second information.

Further features of the present disclosure will become apparent from the following description of exemplary embodiments with reference to the attached drawings.

BRIEF DESCRIPTION OF THE DRAWINGS

FIG. 8 is a flowchart illustrating another example of the processing in the imaging system.

FIG. 11 is a flowchart of automatic white balance control at the time of the trace playback.

DESCRIPTION OF THE EMBODIMENTS

Figure 1:
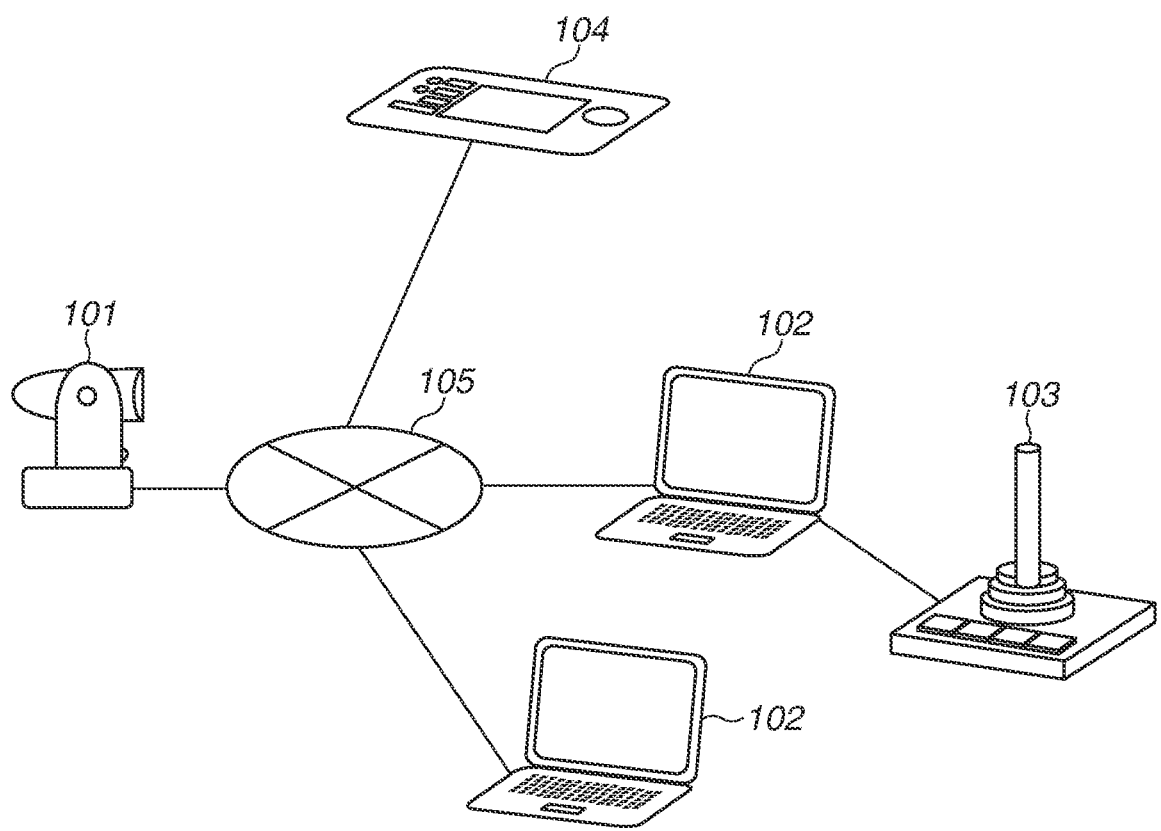
FIG. 1 illustrates an example of the system configuration of an imaging system.

In the following description, a representative exemplary embodiment of the present disclosure will be described in detail with reference to the accompanying drawings.

In the present specification and drawings, components having substantially the same functions and configurations will be identified by the same reference numerals, and redundant descriptions thereof will be omitted.

<System Configuration>

An example of the system configuration of an imaging system according to the present exemplary embodiment will be described with reference to FIG. 1. The imaging system according to the present exemplary embodiment includes an imaging apparatus 101, and a terminal apparatus 102 used to control the action of this imaging apparatus 101. The imaging apparatus 101 and the terminal apparatus 102 are connected so as to be able to transmit and receive information to and from each other via a network 105. A plurality of terminal apparatuses 102 may be connected to the imaging apparatus 101 via the network 105. A controller 104 may be employed instead of at least some of the terminal apparatuses 102. An input device 103 for receiving an operation regarding the control of the action of the imaging apparatus 101 from a user may be connected to at least some of the terminal apparatuses 102.

The imaging apparatus 101 may capture an image in an imaging range according to an instruction from another apparatus (e.g., the terminal apparatus 102, the controller 104, or the like) via the network 105. The imaging apparatus 101 may control conditions regarding imaging (e.g., focus, an aperture, a shutter speed, a gain, and the like) according to an instruction from another apparatus via the network 105. According to an instruction from another apparatus via the network 105, the imaging apparatus 101 may transmit data of a still image or a moving image according to a result of imaging to this other apparatus. In the following description, when being not especially referred to distinctively from each other, the still image and the moving image will also be referred to as an "image" for convenience.

In the following description, when being not especially referred to distinctively from each other, the data of each of the still image and the moving image will also be referred to as "image data" for convenience.

The terminal apparatus 102 can be realized by an information processing apparatus having a communication function, such as a personal computer (PC), a tablet terminal, and a smart-phone. The terminal apparatus 102 includes an output device for presenting information to the user, such as a display, and an input device for receiving an instruction from the user, such as a touch panel. At least either one of the output device and the input device may be realized as a device to be externally attached to the terminal apparatus 102.

For example, the input device 103 corresponds to an example of the input device externally attached to the terminal apparatus 102. The input device 103 may be connected to the terminal apparatus 102 via a transmission path based on a standard, such as Universal Serial Bus (USB) and Bluetooth®. An input device for realizing a smooth pan/tilt/zoom (PTZ) operation, which is difficult to realize using only a graphical user interface (GUI) presented by an application, such as a joystick, may be employed as the input device 103.

The controller 104 schematically indicates hardware including an input interface regarding an operation of the imaging apparatus 101. The controller 104 is connected to the imaging apparatus 101 via the network 105 in the example illustrated in FIG. 1, but this example does not necessarily limit the connection method between the controller 104 and the imaging apparatus 101. As a specific example, the controller 104 may be connected to the imaging apparatus 101 by a connection method such as a serial connection.

The type of the network 105 is not particularly limited as long as communication can be established between the imaging apparatus 101, and the terminal apparatus 102 and the controller 104. As a specific example, a network in compliance with a communication standard such as ETHERNET may be employed as the network 105. In this case, the network 105 may be realized using a router, a switch, a cable, and the like in compliance with this communication standard. As another example, a network in compliance with a communication standard for wireless communication, such as Wireless Fidelity (Wi-Fi) (registered trademark), Bluetooth®, Long Term Evolution (LTE) registered trademark), and the Fifth Generation Mobile Communication System (5G), may be employed as the network 105. The network 105 may be realized by a plurality of networks. In this case, different two or more types of networks may be included in this plurality of networks. The communication between the imaging apparatus 101, and the terminal apparatus 102 and the controller 104 may be mediated by another communication apparatus.

The configuration illustrated in FIG. 1 is merely an example, and does not necessarily limit the system configuration of the imaging system according to the present exemplary embodiment. As a specific example, the imaging apparatus 101 may be realized as a stand-alone apparatus. In this case, an input device for receiving an instruction from the user and an output device for presenting information to the user may be provided to this imaging apparatus 101. In this case, at least either one of the input device and the output device may also be realized as a device externally attached to the imaging apparatus 101.

<Configuration>

An example of the configuration of the imaging system according to the present exemplary embodiment will be described focusing on each of the imaging apparatus 101 and the terminal apparatus 102, in particular.

Initially, an example of the configuration of the imaging apparatus 101 will be described with reference to FIG. 2. The imaging apparatus 101 includes a system control unit 201, an imaging unit 202, an image processing unit 203, a lens driving unit 204, an imaging angle-of-view control unit 205, a focus control unit 206, a pan driving unit 207, a tilt driving unit 208, and a pan/tilt control unit 209. The imaging apparatus 101 may include a storage unit 210 and a program memory 211. The imaging apparatus 101 may include a communication unit 220.

The system control unit 201 instructs each component of the imaging apparatus 101, thus controlling various actions of the imaging apparatus 101 (esp., an action regarding imaging). The system control unit 201 can be realized by a computing device, such as a central processing unit (CPU) and a micro processing unit (MPU).

The system control unit 201 may communicate various types of information with other apparatuses (e.g., the terminal apparatus 102) via the network 105 by controlling the action of the communication unit 220, which will be described below. As a specific example, the system control unit 201 may receive a control command regarding imaging from the terminal apparatus 102 via the network 105 and analyze this control command, thus performing processing according to this control command. Hereinafter, the control command regarding imaging will also be referred to as a "camera control command" for convenience.

The camera control command includes a request command for requesting the imaging apparatus 101 to transmit image data and various types of setting values, and a setting command regarding the specification of a setting value.

For example, the system control unit 201 may receive the request command regarding the transmission of image data from the terminal apparatus 102. In this case, the system control unit 201 instructs the communication unit 220 to transmit image data generated by the image processing unit 203 to this terminal apparatus 102 via the network 105.

As another example, the system control unit 201 may receive the request command regarding the transmission of a setting value regarding imaging, such as setting values regarding focusing, zooming, panning, tilting, and the like from the terminal apparatus 102. In this case, the system control unit 201 may acquire the setting value specified in this request command from a component managing this setting value and instruct the communication unit 220 to transmit the acquired information to the terminal apparatus 102 via the network 105. Examples of candidates of components managing various types of setting values include the image processing unit 203, the imaging angle-of-view control unit 205, the focus control unit 206, and the pan/tilt control unit 209. The system control unit 201 may transmit, to the terminal apparatus 102 via the network 105, not only the currently set value but also, for example, information about a settable range of this value as the information about a setting value regarding imaging.

The system control unit 201 may receive the setting command regarding the specification of a setting value regarding imaging from the terminal apparatus 102. In this case, the system control unit 201 instructs the component corresponding to this setting value to perform control based on the setting value specified by this setting command. Examples of candidates of such a component include the image processing unit 203, the imaging angle-of-view control unit 205, the focus control unit 206, and the pan/tilt control unit 209. The actions of, for example, the imaging unit 202, the lens driving unit 204, the pan driving unit 207, and the tilt driving unit 208 are controlled by these components, so that the action of the imaging apparatus 101 according to the setting value specified by the terminal apparatus 102 is realized.

The imaging unit 202 includes an imaging optical system such as a lens, and an image sensor. An optical image (a subject image) formed by the imaging optical system is optically guided to the image sensor and forms an image thereon, and is photoelectrically converted into an electric signal by the image sensor. The electric signal (an image signal) into which the above-described optical image is photoelectrically converted is subjected to, for example, a gain adjustment and an analog-to-digital (A/D) conversion from an analog signal into a digital signal by an A/D converter, and is then output to the image processing unit 203 after that.

The image processing unit 203 applies various types of image processing, resolution conversion processing, compression/encoding processing, and/or the like on the image signal output from the imaging unit 202, thus generating the image data. The image data generated by the image processing unit 203 may be, for example, stored into the storage unit 210, which will be described below. As another example, this image data may be transmitted to another apparatus (e.g., the terminal apparatus 102) via the network 105 by the communication unit 220, which will be described below.

The lens driving unit 204 includes a driving system regarding control of the position of at least a part of optical members among a series of optical members forming the imaging optical system of the imaging unit 202, a motor serving as a power source of this driving system, and the like. In the present exemplary embodiment, an optical member regarding focus control (hereinafter also referred to as a "focus lens"), and an optical member regarding control of the angle of view (hereinafter also referred to as a "zoom lens") are included as the optical members targeted for the positional control to be performed by the lens driving unit 204. The action of the lens driving unit 204 is controlled by the imaging angle-of-view control unit 205 and the focus control unit 206.

The imaging angle-of-view control unit 205 instructs the lens driving unit 204 to control the position of the zoom lens based on the setting value regarding zooming that is output from the system control unit 201. Examples of the setting value regarding zooming include a setting value of a focal length.

The focus control unit 206 instructs the lens driving unit 204 to control the position of the focus lens based on the setting value regarding focusing that is output from the system control unit 201. The position in the imaging range in which the focus lens focuses (a focus position) is controlled by the position of the focus lens being controlled.

At least a part of actions among a series of actions regarding imaging by the imaging apparatus 101 may be automatically controlled according to various types of conditions such as the imaging environment.

As a specific example, in autofocus (AF), an evaluation value is calculated from contrast in the image according to a result of imaging performed by the imaging unit 202, and the focus control unit 206 controls the position of the focus lens according to this evaluation value. As a result, the focus of the imaging unit 202 is controlled so as to bring the subject in the imaging range into focus.

Automatic control may be applied to not only the focus control but also, for example, an exposure (an aperture, a shutter speed, a gain, a neutral density (ND) filter, and the like), white balance, a noise reduction, and gamma control. For such automatic control, the component that performs this control may be changed as appropriate according to details of this control. As a specific example, the noise reduction, the gamma control, and the like may be performed by the image processing unit 203.

The pan driving unit 207 includes a driving system for realizing a pan action that controls the imaging direction of the imaging unit 202 in the pan direction, a motor serving as a power source of this driving system, and the like. The action of the pan driving unit 207 is controlled by the pan/tilt control unit 209.

The tilt driving unit 208 includes a driving system for realizing a tilt action that controls the imaging direction of the imaging unit 202 in the tilt direction, a motor serving as a power source of this driving system, and the like. The action of the tilt driving unit 208 is controlled by the pan/tilt control unit 209.

The pan/tilt control unit 209 instructs at least either the pan driving unit 207 or the tilt driving unit 208 to control the imaging direction (control regarding the pan action and the tilt action) based on the setting values regarding panning and tilting that are output from the system control unit 201.

The storage unit 210 stores various types of data (e.g., the image data) into at least either an internal storage or an external storage. The storage unit 210 may read out various types of data stored in the internal storage and the external storage. The above-described external storage and the above-described internal storage can be realized by, for example, a nonvolatile memory represented by a hard disk drive (HDD) and a solid state drive (SSD).

The program memory 211 is a storage area storing a program regarding the control of the action of the imaging apparatus 101 therein. The system control unit 201 realizes various types of actions of the imaging apparatus 101 by loading this program stored in the program memory 211 and executing it.

The communication unit 220 is a communication interface that allows the components of the imaging apparatus 101 (e.g., the system control unit 201) to communicate various types of information with other apparatuses (e.g., the terminal apparatus 102) via the network 105. For example, the communication unit 220 may receive the camera control command from the terminal apparatus 102 via the network 105 and output this camera control command to the system control unit 201. In this case, the communication unit 220 may transmit a response to the above-described camera control command to the above-described terminal apparatus 102 via the network 105 according to an instruction from the system control unit 201. The camera control command has been described above, and thus, a detailed description thereof will be omitted here.

Figure 2:
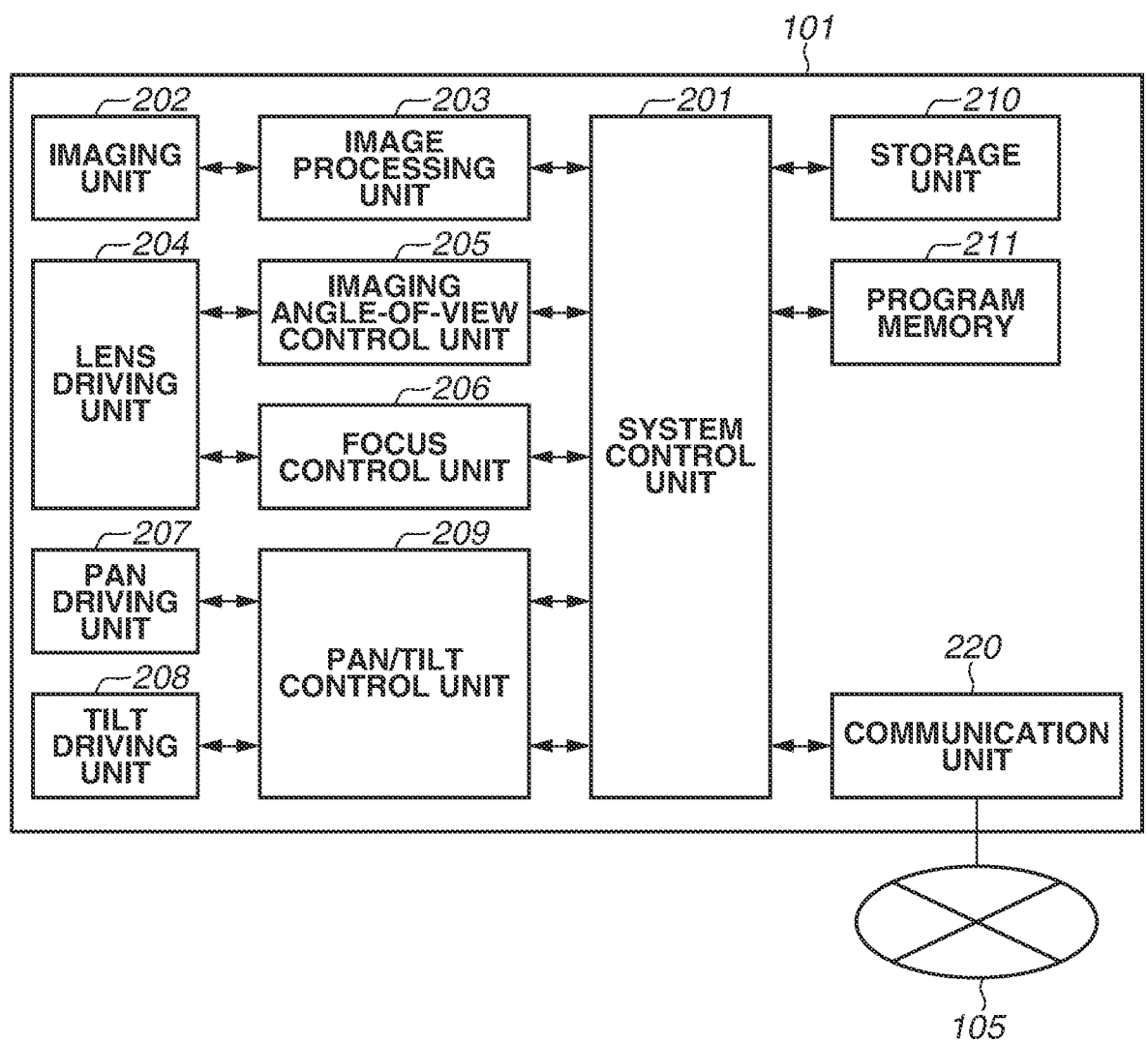
FIG. 2 illustrates an example of the configuration of an imaging apparatus.

The configuration illustrated in FIG. 2 is merely an example, and does not limit the configuration of the imaging apparatus 101 according to the present exemplary embodiment. For example, the configuration illustrated in FIG. 2 may be realized by a plurality of apparatuses cooperating with one another.

As a specific example, some of the components among the series of components of the imaging apparatus 101 may be provided in another apparatus. As a specific example, components equivalent to the system control unit 201, the storage unit 210, and the program memory 211 may be provided on another apparatus capable of transmitting and receiving information to and from the imaging apparatus 101 via a predetermined transmission route. In this case, the other apparatus corresponds to an example of an "information processing apparatus" that controls the action of the imaging apparatus 101.

As another example, a load regarding processing of at least some of the components among the series of components of the imaging apparatus 101 may be divided among a plurality of apparatuses.

Subsequently, an example of the configuration of a client apparatus will be described with reference to FIG. 3. The client apparatus corresponds to an apparatus used to control the action of the imaging apparatus 101, such as the terminal apparatus 102 and the controller 104. The client apparatus includes a system control unit 301, a communication unit 302, a storage unit 303, and a program memory 305. The client apparatus may include an input unit 304.

The system control unit 301 instructs each component of the client apparatus, thus controlling various types of actions of this client apparatus. The system control unit 301 can be realized by a central processing device such as a CPU.

For example, the system control unit 301 may generate the camera control command according to an operation that the input unit 304 receives from the user and instruct the communication unit 302 to transmit this camera control command to the imaging apparatus 101 via the network 105. The mechanism in which the camera control command is transmitted from the client apparatus to the imaging apparatus 101 in this manner enables the imaging apparatus 101 to be also remotely controlled via the client apparatus.

The system control unit 301 may instruct the imaging apparatus 101 to, for example, record information about details of the control of the action and reproduce the above-described action (play back of details of the control) later based on this recorded information. Hereinafter, the term "trace function" will also be used to refer to the series of functions of recording information about the details of the control of the action of the imaging apparatus 101 and reproducing the action of the imaging apparatus 101 later based on this information in the above-described manner for convenience. The term "trace recording" will also be used to refer to the function regarding recording information about the details of the control of the action of the imaging apparatus 101 and the term "trace playback" will also be used to refer to the function regarding reproducing the action of the imaging apparatus 101 (playing back the details of the control) later based on the recorded information.

When the communication unit 302 receives a response from the imaging apparatus 101, the system control unit 301 may perform processing according to this response by analyzing this response.

The communication unit 302 is a communication interface that allows the components of the client apparatus (e.g., the system control unit 301) to communicate various types of information with other apparatuses (e.g., the imaging apparatus 101) via the network 105. For example, the communication unit 302 may transmit the camera control command to the imaging apparatus 101 via the network 105 and receive a response to this camera control command from this imaging apparatus 101. The camera control command has been described above, and thus, a detailed description thereof will be omitted here.

The storage unit 303 stores therein various types of data (e.g., the image data) into either an internal storage or an external storage. The storage unit 303 may read out the various types of data stored in the internal storage and the external storage. The above-described external storage and internal storage can be realized by, for example, a nonvolatile memory represented by an HDD and an SSD.

The program memory 305 is a storage area storing a program regarding the control of the action of the client apparatus (e.g., programs of various types of applications) therein. The system control unit 301 realizes various types of actions of the client apparatus by loading this program stored in the program memory 305 and executing it.

The input unit 304 is an input interface for receiving an instruction from the user.

The input unit 304 can be realized by an input device, such as a button provided to the client apparatus, a keyboard, a pointing device, and a joystick. As another example, the input unit 304 may be realized by a touch panel provided on a display unit (not illustrated) such as a display.

Figure 3:
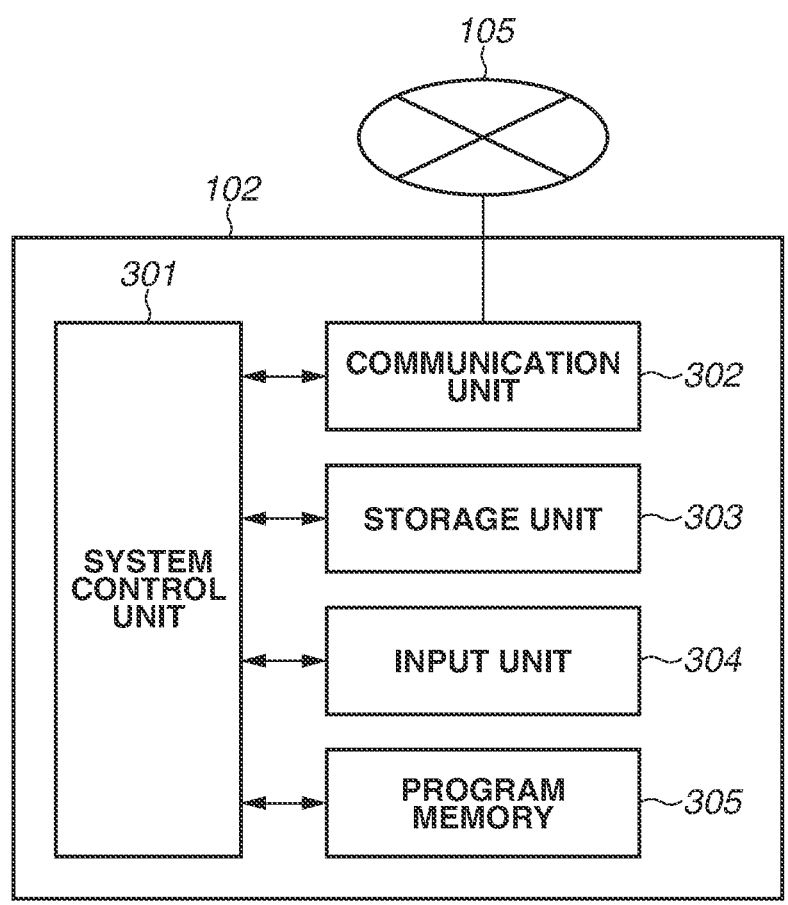
FIG. 3 illustrates an example of the configuration of a client apparatus.

The configuration illustrated in FIG. 3 is merely an example, and does not limit the configuration of the client apparatus according to the present exemplary embodiment.

For example, no component corresponding to a display unit such as a display is illustrated in the example illustrated in FIG. 3, but the client apparatus may include a component corresponding to this display unit. Providing a component corresponding to the display unit to the client apparatus in this manner enables the client apparatus to present, for example, an image according to a result of imaging by the imaging apparatus 101 and the setting value applied to the action regarding the imaging by this imaging apparatus 101 to the user.

The configuration illustrated in FIG. 3 may be realized by a plurality of apparatuses cooperating with one another.

As a specific example, some of the components among the series of components of the client apparatus may be provided in another apparatus. As a specific example, components equivalent to the input unit 304 and the storage unit 303 may be provided on another apparatus capable of transmitting and receiving information to and from the client apparatus via a predetermined transmission route.

As another example, a load regarding processing of at least some of the components among the series of components of the client apparatus may be divided among a plurality of apparatuses.

Hereinafter, various descriptions will be given assuming that the terminal apparatus 102 is employed as the client apparatus for convenience.

<Processing>

An example of processing in the imaging system according to the present exemplary embodiment will be described with reference to FIGS. 4 and 5.

An example of processing regarding the trace recording will now be described with reference to FIG. 4.

In step S401, the system control unit 201 of the imaging apparatus 101 starts a series of processing procedures regarding the trace recording according to an instruction from the terminal apparatus 102.

Initially, in step S402, the system control unit 201 records information about the current state of the imaging apparatus 101 (e.g., the imaging direction and the imaging conditions) into a predetermined storage area when starting the trace recording. Hereinafter, the information about the state of the imaging apparatus 101 will also be referred to as "camera information" for convenience. The storage unit 210 of the imaging apparatus 101 may be used or the storage unit 303 of the terminal apparatus 102 may be used as the storage area. In the case where the storage unit 303 of the terminal apparatus 102 is used as the storage area, the system control unit 201 can fulfill this operation by transmitting the camera information to the terminal apparatus 102 via the network 105.

Hereinafter, various descriptions will be provided assuming that the storage unit 210 of the imaging apparatus 101 is used as the above-described storage area for convenience.

In step S403, the system control unit 201 determines whether the terminal apparatus 102 receives an operation from the user (i.e., whether the terminal apparatus 102 receives an instruction from the user).

If the system control unit 201 determines that the terminal apparatus 102 receives an operation from the user in step S403 (YES in step S403), the processing proceeds to step S404. In this case, in step S404, the system control unit 201 records, from the terminal apparatus 102 via the network 105, information about the operation received by this terminal apparatus 102 from the user (hereinafter also referred to as "operation information") into the storage unit 210. At this time, the system control unit 201 may record time information in association with the operation information. The operation information corresponds to an example of "first information". The operation in step S404 corresponds to an example of "first recording processing".

If the system control unit 201 determines that the terminal apparatus 102 receives no operation from the user in step S403 (NO in step S403), the processing proceeds to step S405. In this case, the operation in step S404 is skipped.

In step S405, the system control unit 201 checks whether a change, in the state of the imaging apparatus 101, due to automatic control of the action of the imaging apparatus 101 is detected.

If the system control unit 201 determines that a change, in the state of this imaging apparatus 101, due to automatic control of the action of the imaging apparatus 101 is detected in step S405 (YES in step S405), the processing proceeds to step S406. In this case, in step S406, the system control unit 201 records information about the change, in the state of this imaging apparatus 101, due to automatic control of the action of the imaging apparatus 101 (hereinafter also referred to as "change information") into the storage unit 210. In the case where the operation information has been recorded in step S404, the change information is additionally recorded next to the operation information, which leads to the establishment of association between the operation information and the change information. The change information corresponds to an example of "second information". The processing in step S405 corresponds to an example of "second recording processing".

If the system control unit 201 determines that no change, in the state of this imaging apparatus 101, due to automatic control of the action of the imaging apparatus 101 is detected in step S405 (NO in step S405), the processing proceeds to step S407. In this case, the operation in step S406 is skipped.

Now, the change information recorded in step S406 will be further described supplementarily. The change information can include the information about the focus, the exposure (the aperture, the shutter speed, the gain, the ND filter, and the like), the white balance, the noise reduction, the gamma control, and the like, described above in conjunction with FIG. 2.

As a specific example, for the focus control, the change information may include information about, for example a change in distance information between the imaging apparatus 101 and the subject and the evaluation value information when the subject is in focus. For the exposure control, the change information may include information about a change in the exposure chart. For the white balance, the change information may include information about a change in the color temperature. For the noise reduction, the change information may include information about a change in the filter strength. For the gamma control, the change information may include information about a change in a dark portion correction and a high luminance correction due to the automatic control. The above-described information is merely an example, and the change information can include not only the above-described examples but also any types of information that relates to details of automatic control of the action of the imaging apparatus 101.

In step S407, the system control unit 201 determines whether to end the trace recording. As a specific example, the system control unit 201 may determine whether to end the trace recording according to whether an instruction regarding the end of the trace recording is received from the user.

If the system control unit 201 determines not to end the trace recording in step S407 (NO in step S407), the processing proceeds to step S403. This case leads to a repetition of the operations in step S403 and the subsequent steps. This results in chronological and sequential recording of the operation information and the change information. Hereinafter, the data of the operation information and the change information chronologically and sequentially recorded by the trace recording will also be referred to as "trace data".

If the system control unit 201 determines to end the trace recording in step S407 (YES in step S407), the processing proceeds to step S408.

In step S408, the system control unit 201 ends the control regarding the trace recording (e.g., the control regarding the recording of the operation information and the change information).

In step S409, the system control unit 201 records the camera information about the state of the imaging apparatus 101 at the time of the end of the trace recording into the storage unit 210. After that, the system control unit 201 ends the series of processing procedures illustrated in FIG. 4.

Next, an example of processing regarding the trace playback will be described with reference to FIG. 5.

In step S501, the system control unit 201 of the imaging apparatus 101 starts a series of processing procedures regarding the trace playback according to an instruction from the terminal apparatus 102.

In step S502, the system control unit 201 controls the imaging apparatus 101 based on the camera information at the time of the start of the trace recording that is recorded in the storage unit 210 in such a manner that the state of the imaging apparatus 101 matches the state thereof at the time of the start of this trace recording. As a result, the state of the imaging apparatus 101 (e.g., the imaging direction and the imaging conditions) is set to a substantially similar state to the state thereof at the time of the start of the trace recording (when step S402 illustrated in FIG. 4 is performed).

In step S503, the system control unit 201 acquires the trace data (i.e., the operation information and the change information) recorded in the trace recording from the storage unit 210. At this time, the system control unit 201 acquires information recorded earliest among pieces of information not acquired yet at this moment from the storage unit 210.

In step S504, the system control unit 201 reflects the details of the control of the action of the imaging apparatus 101 that is indicated in the operation information in the trace data acquired in step S503 into the state set as the target of the control of the imaging apparatus 101 (hereinafter also referred to as a "target state).

In step S505, the system control unit 201 reflects the details of the control of the action of the imaging apparatus 101 that is indicated in the change information in the trace data acquired in step S503 into the automatic control of the action of the imaging apparatus 101. This causes the action of the imaging apparatus 101 to be automatically controlled based on the change information recorded in the trace recording, which enables limitation of, for example, the range of a state change accompanying the control of the action of the imaging apparatus 101 to within the range of the maximum change amount at the time of the trace recording. Under a scene for which the imposition of such a limitation is not required, for example, control under which the change in the state of the imaging apparatus 101 at the time of the trace recording is traced without change may be applied.

In step S506, the system control unit 201 applies the automatic control in which the details of control indicated in the change information has been reflected in step S505 with the aim of achieving the target state in which the details of control indicated in the operation information has been reflected in step S504, and controls the action of the imaging apparatus 101.

In step S507, the system control unit 201 determines whether an instruction regarding the stop of the trace playback is received or whether the trace playback is carried out for the series of pieces of information recorded in the trace recording to the last.

If the system control unit 201 determines that no instruction regarding the stop of the trace playback is received and that the trace playback is not carried out to the last in step S507 (NO in step S507), the processing proceeds to step S503. This case leads to a repetition of the operations in step S503 and the subsequent steps for information not acquired yet through the operation in step S503 among the pieces of information recorded in the storage unit 210 in the trace recording.

If the system control unit 201 determines that an instruction regarding the stop of the trace playback is received or that the trace playback is carried out to the last in step S507 (YES in step S507), the processing proceeds to step S508.

In step S508, the system control unit 201 ends the series of processing procedures regarding the trace playback. This means that the series of processing procedures illustrated in FIG. 5 is ended.

Figure 4:
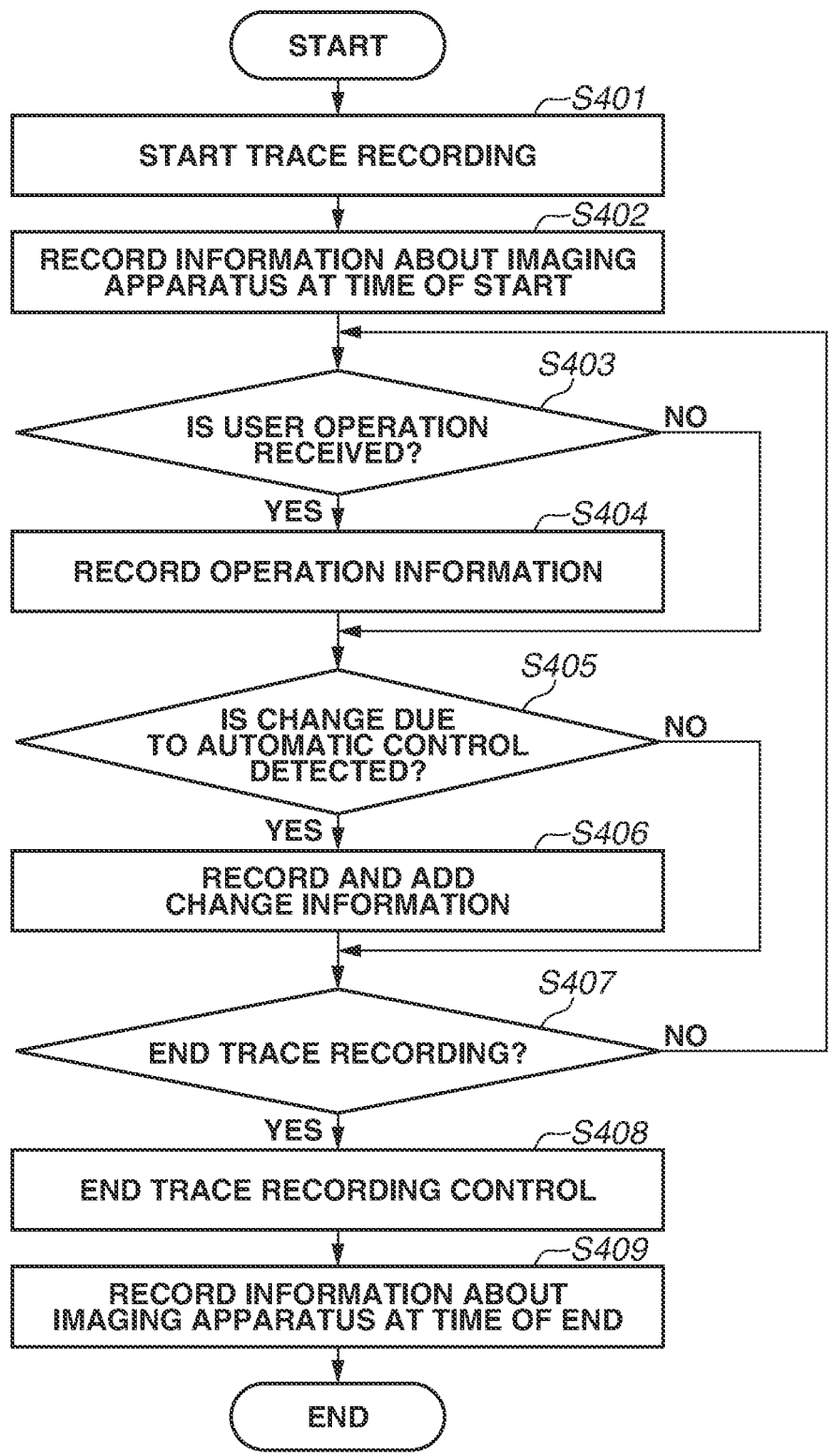
FIG. 4 is a flowchart illustrating an example of processing in the imaging system.
Figure 5:
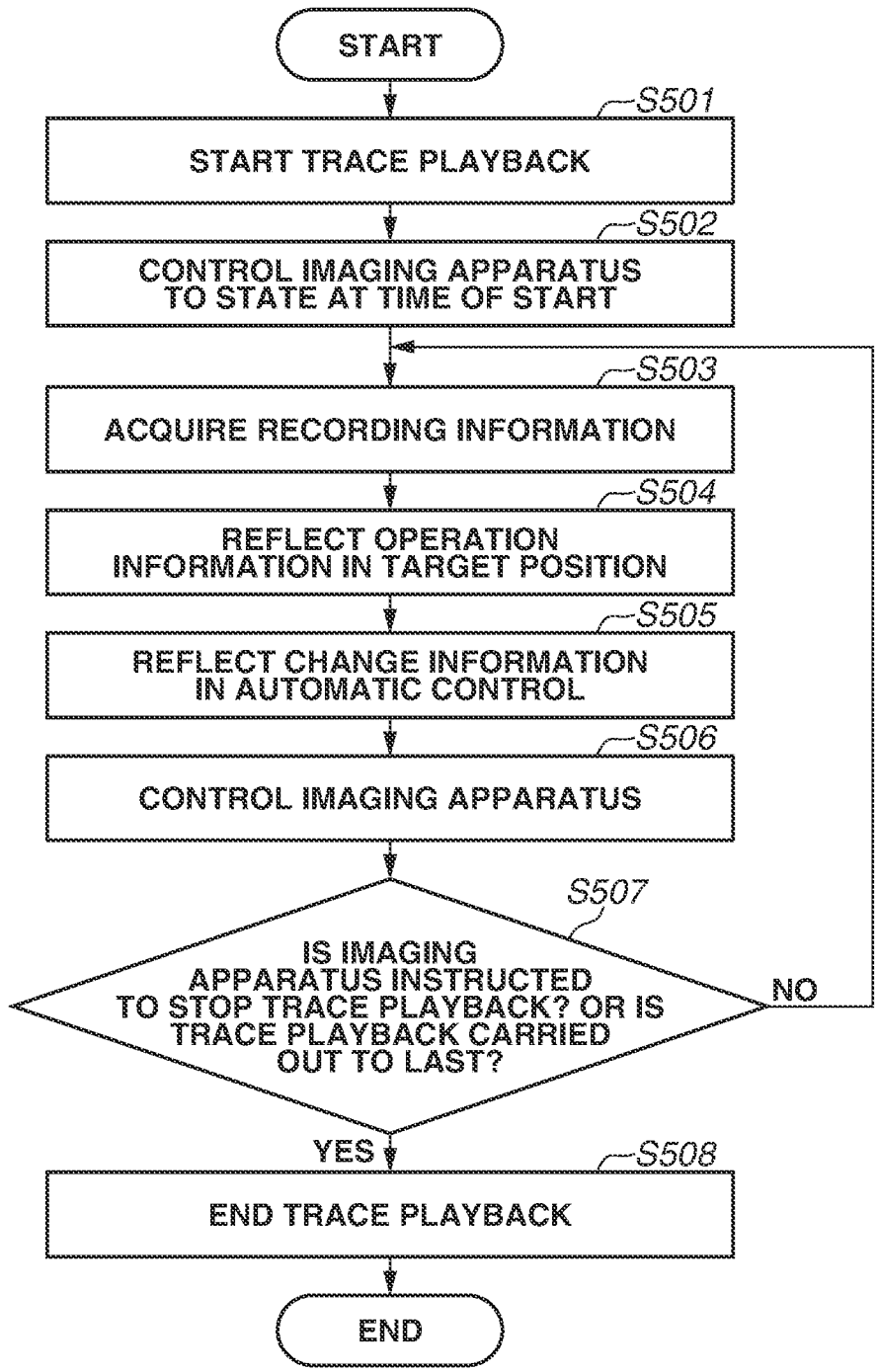
FIG. 5 is a flowchart illustrating an example of processing in the imaging system.

A case where the imaging apparatus 101 itself performs the processing regarding the trace recording and the trace playback has been described as the example described in conjunction with FIGS. 4 and 5, but does not necessarily limit the processing in the imaging system according to the present exemplary embodiment. As a specific example, another apparatus such as the terminal apparatus 102 may perform the processing regarding the trace recording and the trace playback based on communication with the imaging apparatus 101 via the network 105. In this case, the trace data may be recorded in the internal storage or the external storage of this other apparatus.

EMBODIMENTS

An embodiment of the processing in the imaging system according to the present exemplary embodiment will be described with reference to FIGS. 6 to 8, focusing on, in particular, the autofocus control at the time of the trace playback.

An outline of an issue in the autofocus control at the time of the trace playback will now be described with reference to FIGS. 6 and 7A to 7C to facilitate a better understanding of the characteristics of the imaging system according to the present exemplary embodiment. For example, FIG. 6 illustrates an example of a use case of the imaging system according to the present exemplary embodiment, and schematically illustrates a state in which the inside of a wedding hall is imaged by the imaging apparatus 101 under a situation that a wedding ceremony is ongoing in the wedding hall. In the example illustrated in FIG. 6, the imaging system is assumed to be in use under a scene that a person 601, who is set as a main subject, is walking in a direction indicated by an arrow. In this example, the imaging apparatus 101 is disposed to face the person 601, and is subjected to the PTZ control and various types of control regarding imaging with a remote operation.

Figure 6:
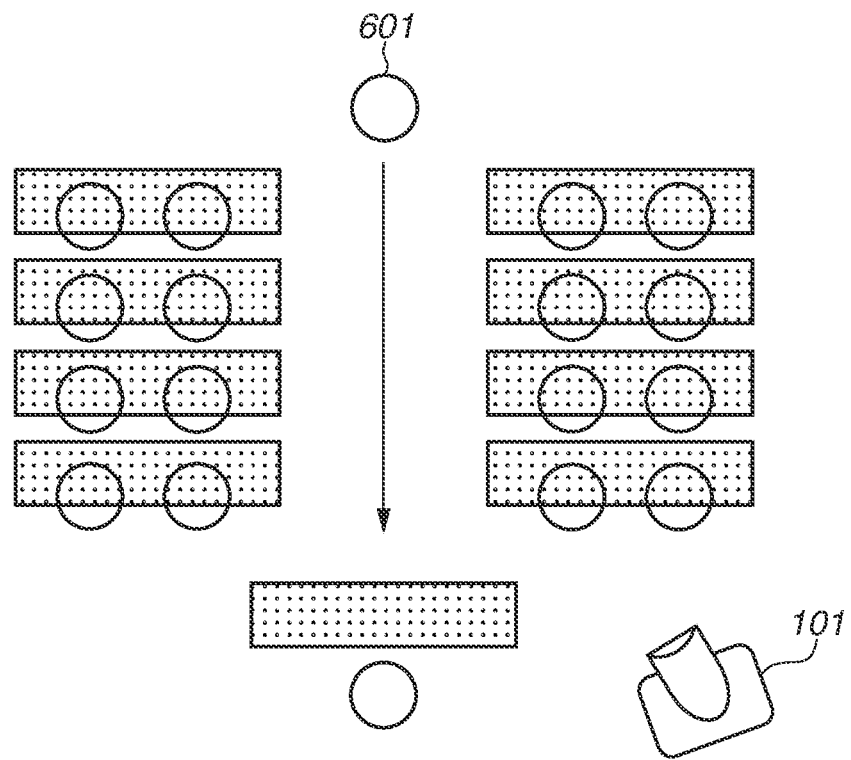
FIG. 6 illustrates an example of a use case of the imaging system.
Figure 7A:
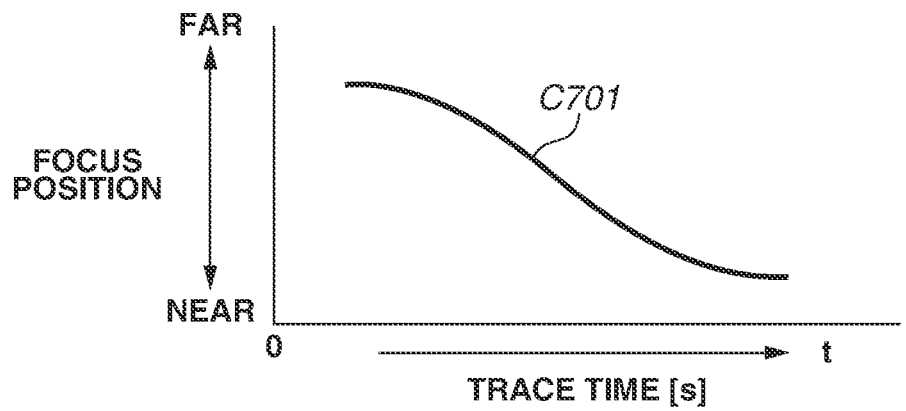
FIGS. 7A to 7C each illustrate an example of a change in the action of the imaging apparatus in trace playback.
Figure 7B:
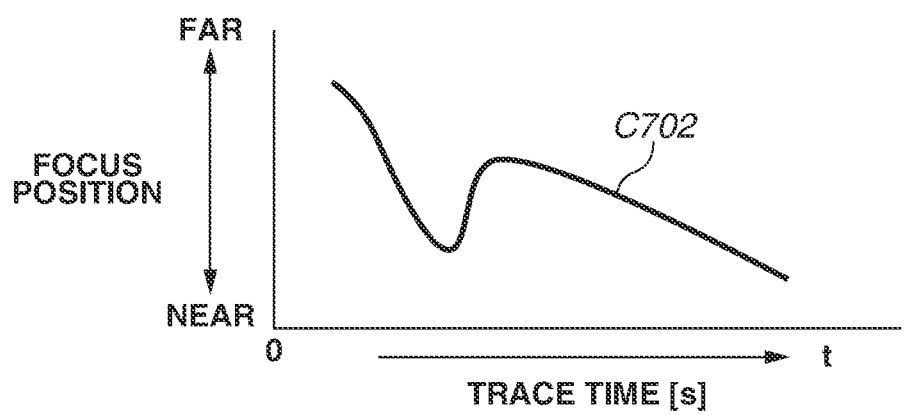
Figure 7C:
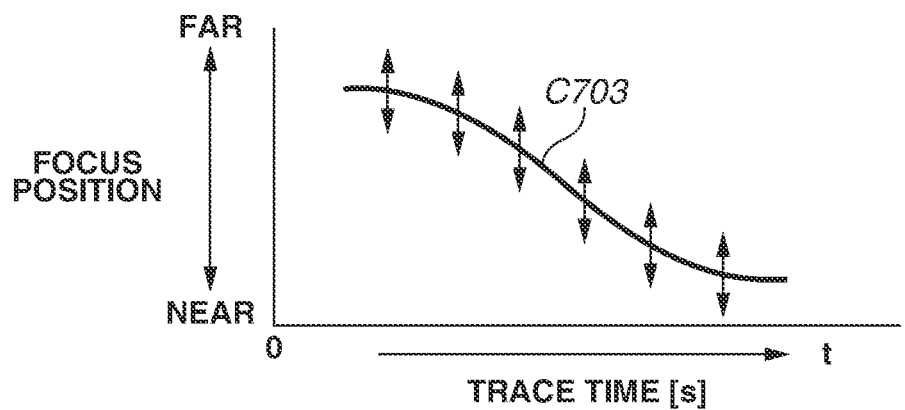

FIGS. 7A to 7C each illustrate a chronological change in the action of the imaging apparatus 101 as a graph, in a case where the action of the imaging apparatus 101 is controlled by the trace playback using the information recorded by the trace recording under the scene illustrated in FIG. 6. More specifically, the example illustrated in each of FIGS. 7A to 7C chronologically indicates a change in the focus position in a case where the subject is in focus with the aid of the autofocus control (the position in the imaging range in which the focus lens focuses). In each of the graphs illustrated in FIGS. 7A to 7C, the horizontal axis represents time and the vertical axis represents the focus position in the depth direction.

A graph C701 illustrated in FIG. 7A indicates a chronological change in the focus position when the focus control is performed as expected. More specifically, the person 601 is moving to further approach the imaging apparatus 101 as time passes. Thus, in a case where the imaging apparatus 101 is kept in the state of focusing on the person 601, the focus position also changes to further approach the imaging apparatus 101 as time passes, as indicated as the graph C701.

In contrast to this, a graph C702 illustrated in FIG. 7B indicates a chronological change in the focus position in a case where the focus control is not performed as expected. More specifically, in the example illustrated in FIG. 7B, a person other than the person 601 (e.g., a guest) is temporarily brought into focus, by which the focus position rapidly changes as indicated as the graph C702 at the time of the transition between the state of focusing on the person 601 and the state of focusing on the other person.

In consideration of such a situation, the imaging system according to the present exemplary embodiment may limit the range of the control of the action of the imaging apparatus 101 at the time of the trace playback based on the information recorded by the trace recording. For example, in the example illustrated in FIG. 7C, the range in which the focus position is searched for (e.g., the range in which the focus lens is driven to bring the subject into focus) is limited based on the information indicated as the graph C701 in FIG. 7A. A range indicated as C703 schematically indicates the range in which the focus position is searched for at a moment-to-moment timing. As illustrated in FIG. 7C, limiting the range of the control of the action of the imaging apparatus 101 enables the imaging apparatus 101 to prevent the occurrence of a rapid change in the action thereof due to a cause which is not expected initially as illustrated in FIG. 7B.

Next, an example of the processing in the imaging system according to the present exemplary embodiment will be described with reference to FIG. 8, focusing on, in particular, the processing in a case where the focus control is performed by the trace playback. In the example illustrated in FIG. 8, the trace data (the operation information and the change information) to be used for the trace playback is recorded in advance through the trace recording processing described in conjunction with FIG. 4. In the following description, the example illustrated in FIG. 8 will be described focusing on portions different from the example illustrated in FIG. 5 and detailed descriptions of portions substantially similar to the example illustrated in FIG. 5 are omitted. For example, the operations in steps S801 and S802 are substantially similar to the operations in steps S501 and S502 illustrated in FIG. 5.

In step S803, the system control unit 201 acquires the trace data (the operation information and the change information) recorded in the trace recording from the storage unit 210. The acquired trace data can include, for example, information about the PTZ position at the time of the trace recording, information about a mode regarding the focus control, information about the focus position, and information about the distance between the imaging apparatus 101 and the subject.

In step S804, the system control unit 201 outputs the information about the distance between the imaging apparatus 101 and the subject and the information about the focus position in the trace data acquired in step S803 to the focus control unit 206. This output allows the focus control unit 206 to recognize a chronological change in the distance between the imaging apparatus 101 and the main subject and the focus position at the time of the trace recording based on the information output from the system control unit 201.

In step S805, the focus control unit 206 updates the driving range at the time of the focus control based on the information output from the system control unit 201 in step S804. As a specific example, the focus control unit 206 may determine the range in which the focus position is searched for (i.e., the range in which the focus lens is driven so as to bring the subject into focus) with reference to the size of a face or a human body in a case where the main subject is a human. As another example, the focus control unit 206 may determine the range in which the focus position is searched for according to the distance between the imaging apparatus 101 and the subject (i.e., depth information) in light of such a characteristic that the blur state changes according to the settings regarding zooming and the aperture. As another example, the focus control unit 206 may determine the range in which the focus position is searched for according to the range in which each unit (e.g., the component relating to the focus control) has been driven at the time of the trace recording.

In step S806, the focus control unit 206 transmits an instruction regarding the focus control to the lens driving unit 204 based on the driving range undated in step S805. This leads to the imposition of a limitation on the range in which the focus position is searched for at the time of the focus control, for example, as described in conjunction with FIG. 7C.

In step S807, the system control unit 201 determines whether an instruction regarding the stop of the trace playback is received or whether the trace playback is carried out for the series of pieces of information (the operation information and the change information) recorded as the trace data in the trace recording to the last of them.

If the system control unit 201 determines that no instruction regarding the stop of the trace playback is received and that the trace playback is not carried out to the last in step S807 (NO in step S807), the processing proceeds to step S803. This leads to a repetition of the operations in step S803 and the subsequent steps for information not acquired yet by the operation in step S803 among the pieces of information recorded in the storage unit 210 in the trace recording.

If the system control unit 201 determines that an instruction regarding the stop of the trace playback is received or that the trace playback is carried out to the last in step S807 (YES in step S807), the processing proceeds to step S808.

In step S808, the system control unit 201 ends the series of processing procedures regarding the trace playback. Thus, the series of processing procedures illustrated in FIG. 8 is ended.

An embodiment of the processing in the imaging system according to the present exemplary embodiment has been described in conjunction with FIGS. 6 to 8, focusing on, in particular, the autofocus control at the time of the trace playback. The employment of the control as in the above-described example improves the stability of the control of the action of the imaging apparatus 101 at the time of the trace playback even in a case where the automatic control is applied to the action of the imaging apparatus 101 at the time of the trace recording. In this manner, the imaging system according to the present exemplary embodiment enables the previously performed action to be reproduced later in a further suitable manner even under a situation that the action regarding imaging is automatically controlled.

First Exemplary Modification

An exemplary modification of the imaging system according to the present exemplary embodiment will be described with reference to FIGS. 9A and 9B and 10A and 10B. As described above, in the imaging system according to the present exemplary embodiment, the trace data (the operation information and the change information) is recorded in the trace recording and the action of the imaging apparatus 101 is controlled based on this trace data in the trace playback. The imaging system according to the present exemplary modification is different from the imaging system according to the above-described exemplary embodiment in terms of the provision of a function of editing the trace data recorded in the trace recording. Thus, in the following description, the imaging system according to the present exemplary modification will be described focusing on different portions from the imaging system according to the above-described exemplary embodiment and detailed descriptions of substantially portions similar to the imaging system according to the above-described exemplary embodiment are omitted.

Figure 9A:
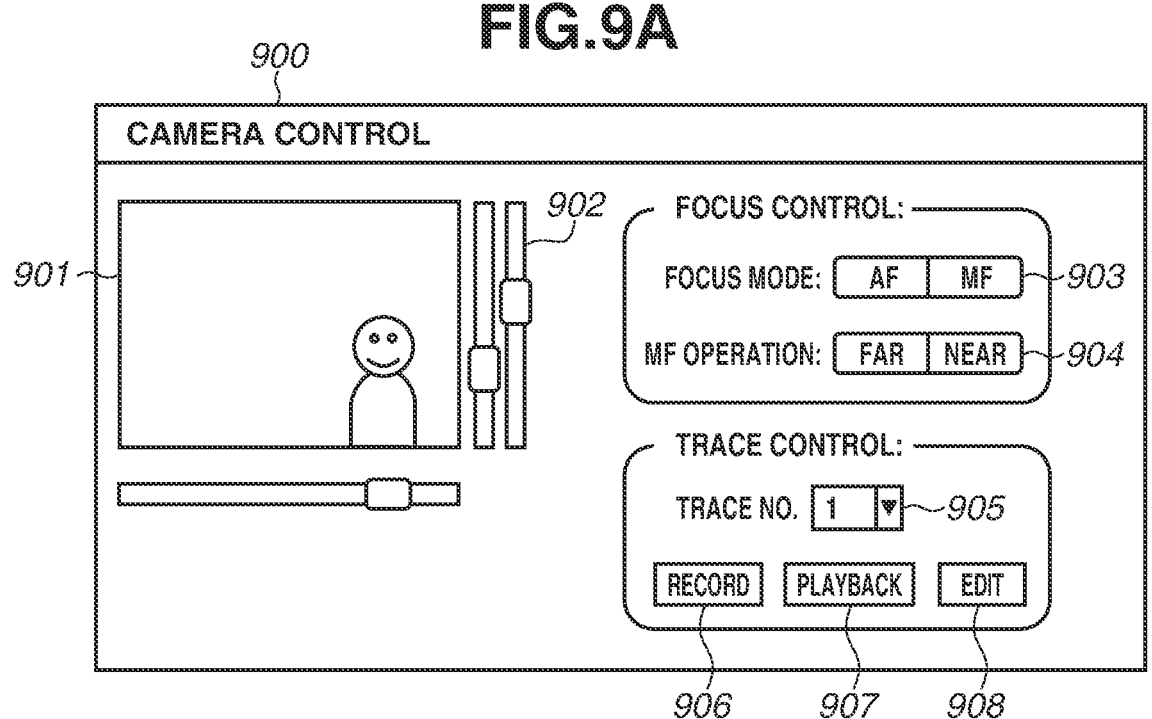
FIGS. 9A and 9B each illustrate an example of a user interface (UI) of the imaging system.
Figure 9B:
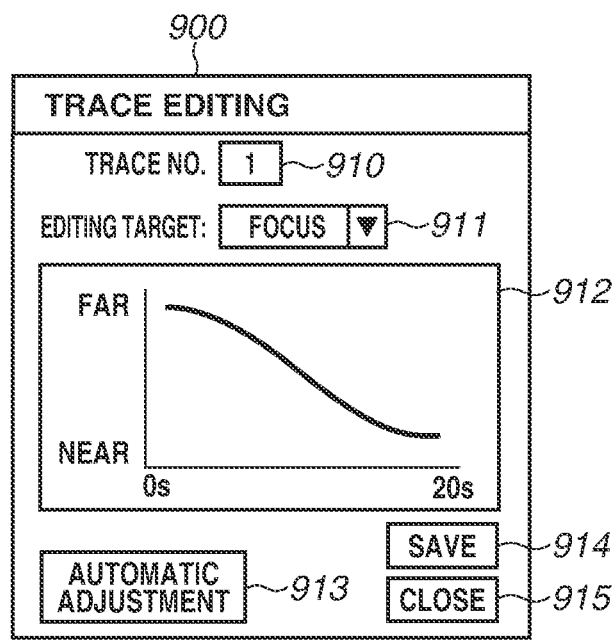

Initially, FIGS. 9A and 9B will be described. FIGS. 9A and 9B each illustrate an example of a user interface (UI) of the imaging system according to the present exemplary modification. More specifically, an operation screen 900 illustrated in FIG. 9A indicates an example of a UI for receiving an instruction regarding the control of the action of the imaging apparatus 101 (esp., the action regarding imaging) from the user. For example, by a predetermined application being executed on the terminal apparatus 102, the operation screen 900 is presented to the user via an output unit of this terminal apparatus 102.

The operation screen 900 includes an image display region 901, a PTZ bar 902, a focus mode operation portion 903, and a manual focus (MF) operation portion 904. The operation screen 900 includes a trace number (No.) setting portion 905, a recording button 906, a playback button 907, and an editing button 908 as UIs regarding the trace function.

The image display region 901 is a display region for displaying an image according to a result of imaging by the imaging apparatus 101. The display of the above-described image in the image display region 901 enables the user to remotely operate the imaging apparatus 101 while checking this image.

The PTZ bar 902 is an input interface for receiving an instruction regarding the pan, tilt, and zoom control from the user.

The focus mode operation portion 903 is an input interface for receiving the specification of an action mode regarding the focus control from the user. In the example illustrated in FIG. 9A, either AF (autofocus) or MF (manual focus) can be specified as the action mode regarding the focus control via the focus mode operation portion 903.

The MF operation portion 904 is an input interface for receiving an instruction regarding an adjustment of the focus position from the user in a case where the action mode regarding the focus control is set to MF. In the example illustrated in FIG. 9A, an input interface for controlling the focus position in each of a FAR direction and a NEAR direction is provided as the MF operation portion 904.

The PTZ bar 902 and the focus mode operation portion 903 may be equipped with a function of presenting the value currently set to the imaging apparatus 101.

The trace No. setting portion 905 is an input interface for receiving the specification of identification information for identifying the trace data (the operation information and the change information) targeted for the trace recording, the trace playback, and the editing from the user. Hereinafter, this identification information will also be referred to as a "trace No."

The recording button 906 is an input interface for receiving an instruction regarding the trace recording from the user. When the recording button 906 is pressed, the processing regarding the trace recording described in conjunction with FIG. 4 is started. When the recording button 906 is pressed again after that, the started processing regarding the trace recording is ended. The trace No. specified via the trace No. setting portion 905 is assigned to the trace data (the operation information and the change information) recorded by performing the processing regarding the trace recording.

The playback button 907 is an input interface for receiving an instruction regarding the trace playback from the user. When the playback button 907 is pressed, the processing regarding the trace playback described in conjunction with FIGS. 5 and 8 is started based on the trace data (the operation information and the change information) to which the trace No. specified via the trace No. setting portion 905 is assigned. When the playback button 907 is pressed again, the above-described started processing regarding the trace playback is ended.

The editing button 908 is an input interface for receiving an instruction regarding the editing of the trace data (the operation information and the change information) recorded by the trace recording from the user.

When the editing button 908 is pressed, a trace data editing screen 909 illustrated in FIG. 9B is displayed with the editing target set to the trace data to which the trace No. specified via the trace No. setting portion 905 is assigned.

Next, the trace data editing screen 909 illustrated in FIG. 9B will be described now. The trace data editing screen 909 is an operation screen for receiving an instruction regarding the editing of the trace data from the user. The trace data editing screen 909 includes a trace No. display portion 910, an editing target specification portion 911, a trace data editing portion 912, an automatic adjustment button 913, a save button 914, and a close button 915.

The trace No. display portion 910 is a region where the trace No. assigned to the trace data specified as the editing target is displayed. For example, the trace No. specified via the trace No. setting portion 905 is displayed in the trace No. display portion 910.

The editing target specification portion 911 is an input interface for receiving the specification of data targeted for the editing among the pieces of data regarding the control of various types of actions of the imaging apparatus 101 included in the trace data specified as the editing target from the user. For example, data regarding the focus control is specified in the example illustrated in FIG. 9B. The editing target is not limited only to data regarding the focus control as long as the data is recorded as the trace data, of course. As a specific example, data regarding the PTZ control, a parameter regarding the control of the action of the imaging apparatus 101, and the like may be able to be specified as the editing target.

The trace data editing portion 912 serves as both an output interface regarding a display of the data targeted for the editing and an input interface for receiving an instruction regarding the editing of this data from the user. As a specific example, the data specified via the editing target specification portion 911 in the trace data corresponding to the trace No. displayed in the trace No. display portion 910 is displayed in the trace data editing portion 912.

For example, in the example illustrated in FIG. 9B, the data regarding the focus control is displayed in the trace data editing portion 912 as a graph indicating a chronological change in the focus position. In this case, for example, when the graph displayed in the trace data editing portion 912 is corrected according to an instruction from the user, the data regarding the focus control is edited according to this correction.

The method for displaying the data in the trace data editing portion 912 is not limited only to the method of displaying the data as a graph as in the example illustrated in FIG. 9B, and may be changed as appropriate according to the type of the data targeted for the editing. According to the method of displaying the data in the trace data editing portion 912, the method of editing this data may also be changed as appropriate. As a specific example, a setting value regarding the control of the action of the imaging apparatus 101 that is recorded as the trace data may be displayed in the trace data editing portion 912 as character information such as a numerical value. In this case, for example, with a correction made to the setting value displayed as the character information, the data regarding the focus control may be edited according to this correction.

The automatic adjustment button 913 is an input interface for receiving an instruction regarding an automatic adjustment of the trace data from the user. In a case where the automatic adjustment button 913 is pressed, automatic editing processing based on preset conditions is applied to the data displayed in the trace data editing portion 912.

Figure 10A:
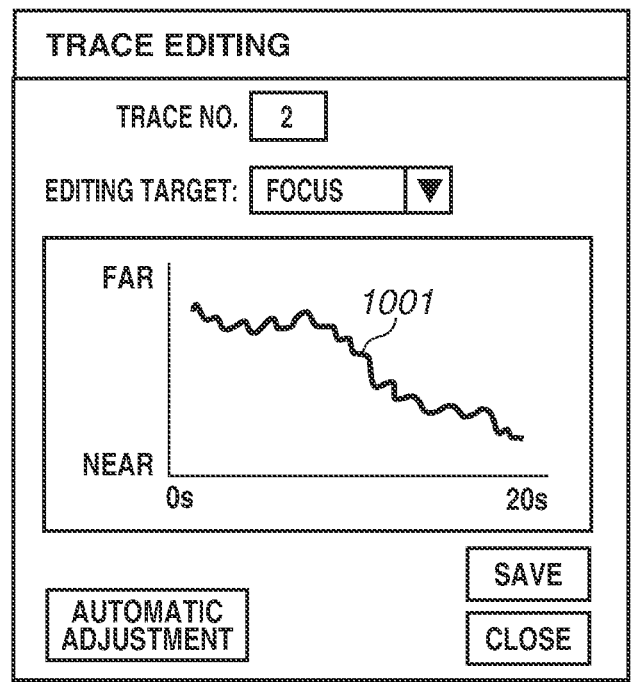
FIGS. 10A and 10B illustrate an example of an automatic adjustment of trace data.
Figure 10B:
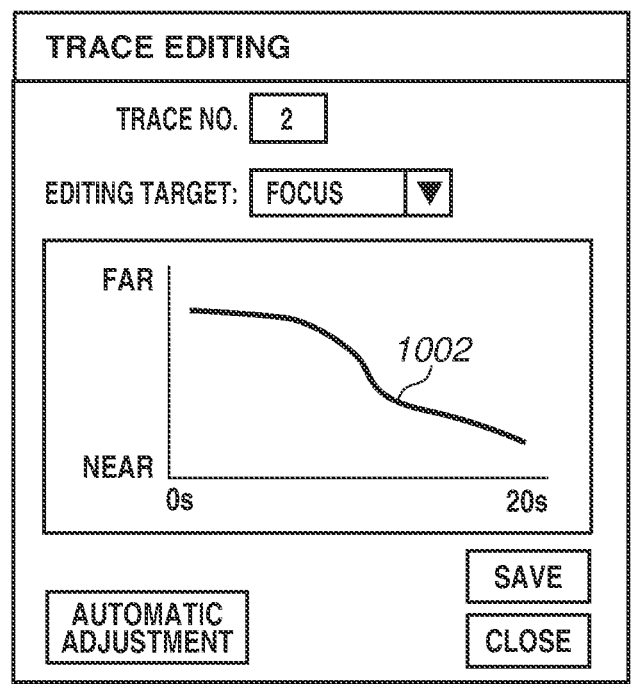

For example, FIGS. 10A and 10B illustrate an example of the automatic adjustment of the trace data.

More specifically, a graph 1001 illustrated in FIG. 10A schematically represents a graph indicating a chronological change in the focus position based on the data regarding the focus control before the automatic adjustment is applied. A subtle change in the focus position accompanying a fluctuation of the focus control or the like emerges in the graph 1001.

In contrast to this, a graph 1002 illustrated in FIG. 10B schematically represents a graph indicating a chronological change in the focus position based on the data regarding the focus control after the automatic adjustment is applied. The graph 1002 indicates an example of a result of an adjustment that is made to the graph 1001 in such a manner that the focus position changes chronologically and smoothly with application of processing such as smoothing, a spline correction, and a removal of extreme data to the graph 1001.

As a specific example, the trace data may be automatically adjusted by removing data corresponding a chronological change exceeding a threshold value (i.e., data indicating a rapid change) among the series of pieces of data before the editing, and conducting liner interpolation based on data before and after this removed data. As a result of such an automatic adjustment made to the data, for example, the details of the focus control indicated as the graph 1001 is adjusted in such a manner that the focus position chronologically and smoothly changes as indicated as the graph 1002.

Now, refer to FIGS. 9A and 9B again.

The save button 914 is an input interface for receiving, from the user, an instruction regarding reflecting a result of the editing of the trace data and saving this trace data after the editing.

When the save button 914 is pressed, the details of editing specified via the trace data editing portion 912 or the details of the automatic adjustment made based on the pressing of the automatic adjustment button 913 serving as a trigger therefor is reflected into the trace data, and this trace data is newly recorded. In recording the trace data after the editing, the trace data before the editing may be overwritten.

The close button 915 is an input interface for receiving an instruction regarding the end of the editing of the trace data from the user. In a case where the close button 915 is pressed, the trace data editing screen 909 is closed with the editing details specified via the trace data editing portion 912 and the details of the automatic adjustment made based on the pressing of the automatic adjustment button 913 serving as a trigger therefor not being reflected into the trace data. In this case, the data indicating the editing details specified via the trace data editing portion 912 or the data indicating the details of the automatic adjustment made based on the pressing of the automatic adjustment button 913 serving as a trigger therefor is to be discarded.

Second Exemplary Modification

FIG. 11 is a flowchart according to a second exemplary modification, in which the above-described control is modified in such a manner that the automatic white balance (AWB) control based on trace recording information is performed as in the autofocus control at the time of the trace playback. The control at the time of the trace recording is similar to FIG. 4, and detailed descriptions will be omitted with respect to portions overlapping the description of FIG. 5 at the time of the trace playback. The configuration diagrams illustrated in FIGS. 2, 3, and the like are also similar to the above-described example, and the descriptions of overlapping contents will be omitted.

Figure 12A:
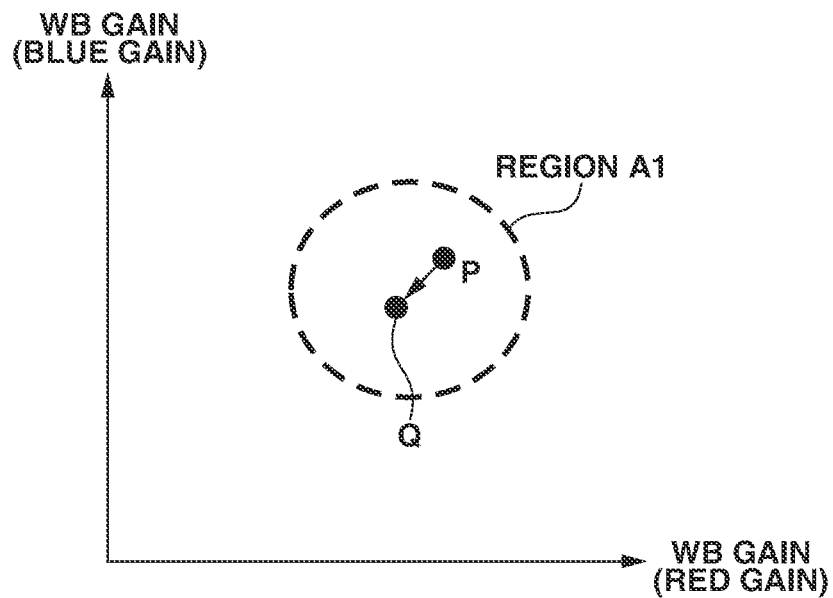
FIGS. 12A and 12B illustrate the automatic white balance control at the time of the trace playback.
Figure 12B:
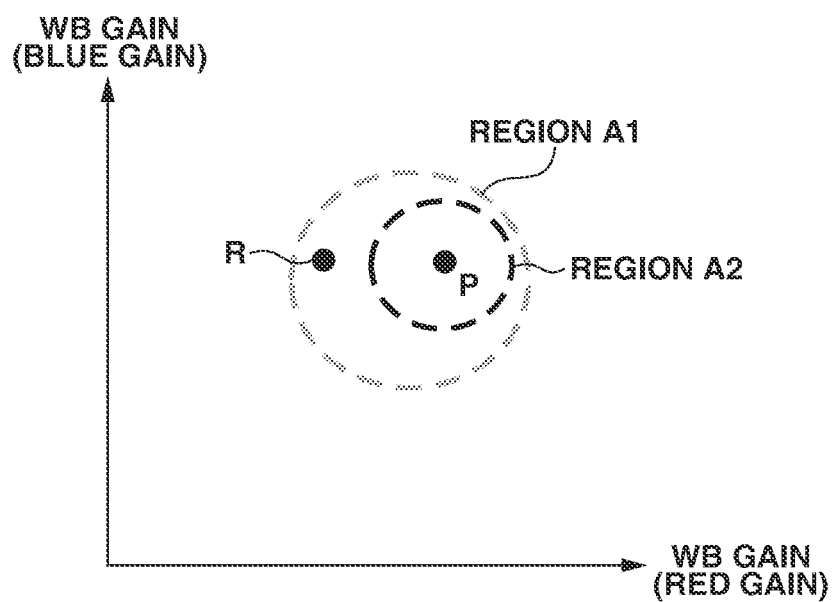

Further, FIGS. 12A and 12B each schematically illustrate an AWB region of the white balance control. The white balance control is control performed by the image processing unit 203, and, color information is acquired for each region in the input image acquired from the imaging unit 202, and a representative value of the color information is calculated. A white balance gain (a WB gain) with which the representative value of the color information in the output image matches a predetermined target value is calculated, and is applied to the output image. The WB gain includes, for example, a Red gain for adjusting redness in the output image and a Blue gain for adjusting blueness in the output image. FIG. 12A illustrates the AWB region at the time of the trace recording, and A1 represents an effective range of the gain set as a target at the time of the AWB. The AWB control at the time of the trace recording is similar to the AWB control as that at the time of normal imaging. In a case where P represents a WB gain which is applied to the current image and Q represents a target WB gain which has been obtained through calculation in the next input image, the image processing unit 203 determines whether the WB gain Q falls within the predetermined region A1, and multiplies the input image by the WB gain Q if the WB gain Q falls within the range A1. If the WB gain Q set as the target falls outside the range A1, the WB gain is kept in a state of P. The range A1, which is the effective range, is designed to such a range in which white balance is suitably controlled and considerably uncomfortable feeling is not given to the user, by application of the WB gain in this effective range to the input image achieves. FIG. 12B illustrates the AWB region at the time of the trace playback, and the effective range of the gain set as the target at the time of the AWB is adjusted to a range A2 narrower than A1 at the time of the trace recording. In a case where R represents the target WB gain which is obtained through calculation in the next input image, R falls within the effective range in the case of the region A1 but falls outside the effective range in the case of the region A2, and therefore the WB gain is kept in the state of P. The trace function is a function used based on the premise that the installation location of the camera, the light source environment, and the like are the same, but a fine adjustment of the WB gain may be to be made due to, for example, an influence of external light from a window in some cases. However, performing the AWB control in a wide range as in A1 may undesirably result in a considerable difference from the color at the time of the storage due to an influence of, for example, the clothes of the subject. The range of the region A2 is determined based on the amount of a change in the WB gain at the time of the trace recording. Since the current value of the WB gain associated with time is recorded in the trace recording information, the WB gain may be controlled within the range of this change amount or may be controlled within a range with a predetermined correction amount added thereto. The state at the time of the trace recording can be reproduced and finely adjusted by narrowing the effective range as in the region A2 at the time of the trace playback in this manner.

Referring back now to the flowchart illustrated in FIG. 11, details thereof will be described. Initially, in step S1101, the system control unit 201 of the imaging apparatus 101 starts the series of processing procedures regarding the trace playback according to an instruction from the terminal apparatus 102, as in the operation in step S501. Next, in step S1102, the image processing unit 203 acquires the WB gain change amount from the trace recording information, and determines the AWB effective range as described in conjunction with FIGS. 12A and 12B. The operations in steps S1103 and S1104 are similar to those in steps S502 and S503, and thus, the descriptions thereof will be omitted here. In step S1105, the system control unit 201 controls the imaging apparatus 101 so as to reproduce the user operation based on the recording information acquired in step S1104. The autofocus control described in the example 1 may be added thereto while being not illustrated. In step S1106, the image processing unit 203 performs the AWB control based on the AWB effective range determined in step S1102. The operations in steps S1103 and S1106 may be replaced with automatic control of the exposure (the aperture, the shutter speed, the gain, and the ND filter), the noise reduction, and the gamma. A change in the exposure diagram is included for the exposure control, a change in the filter strength is included for the noise reduction, and a change in the dark portion correction and the high luminance correction due to the automatic control is included for the gamma. The image can be finely adjusted while a difference from the image at the time of the trace recording is controlled by limiting the control range at the time of the trace playback based on the change range at the time of the trace recording. In a case where the imaging apparatus 101 is equipped with an automatic control function besides them, it may be included in the recording target. The operations in steps S1107 and S1108 are similar to those in steps S507 and S508, and thus, the descriptions thereof will be omitted here.

In the above-described manner, the imaging apparatus 101 performs the AWB control at the time of the trace playback. As a result, stable trace control can be easily provided by recording a change in the camera control due to the automatic settings at the time of the trace recording, together with the user operation, and controlling the imaging apparatus 101 based on the recorded change information at the time of the trace playback.

Third Exemplary Modification

Figure 13:
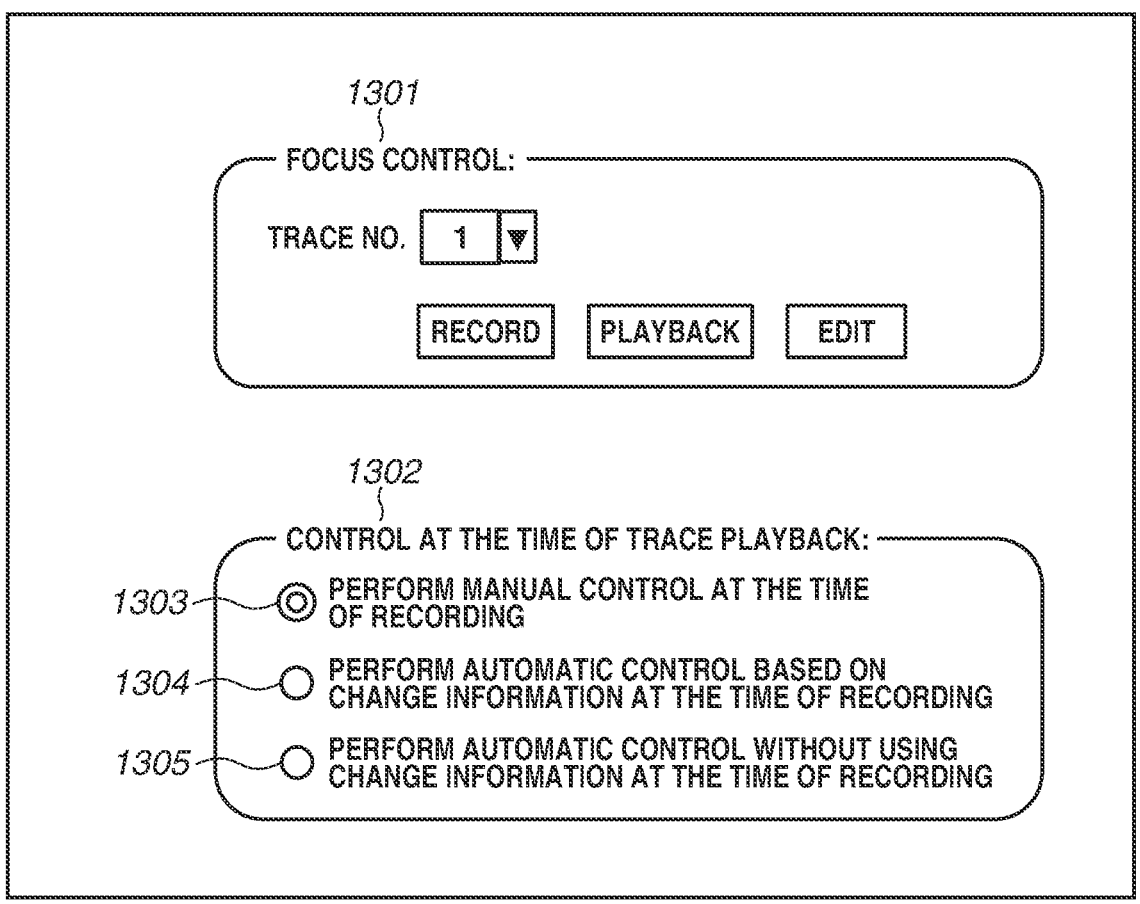
FIG. 13 illustrates an example of a UI of an application.

FIG. 13 illustrates an example of an application screen according to a third exemplary modification, in which the application screen described in conjunction with FIGS. 9A and 9B is modified in such a manner that control is added thereto so as to allow the user to select the control method at the time of the trace playback. The descriptions of portions overlapping the above description will be omitted in the following description.

FIG. 13 illustrates an example of a GUI in which the operation portion of the trace control of the operation screen 900 in FIG. 9A is extracted and a part of control items is added thereto. A trace control portion 1301 is similar to the control items 905 to 908 in FIG. 9A. A setting at a portion of "control at the time of the trace playback" 1302 is control for selecting details of the control when the trace playback button 907 is pressed. More specifically, when the trace playback is carried out with a toggle button 1303 selected, manual control at the time of the trace recording is performed. This setting leads to the playback of the trace information recorded at the time of the trace recording, and can be utilized in a case where the recording information based on the user operation at the time of the trace recording is desired to be faithfully reproduced. Subsequently, in a case where the trace playback is carried out with a toggle button 1304 selected, automatic control is performed based on the change information at the time of the trace recording as in, for example, the processing according to the flowchart illustrated in FIG. 8. Lastly, when the trace playback is carried out with a toggle button 1305 selected, the change information at the time of the trace recording is not used and the operation information is played back under automatic control in a manner similar to the control at the time of the trace recording. In a case where the trace playback is carried out with the toggle button 1305 selected, for example, the operation information about the imaging range at the time of the trace recording is played back. In contrast, the information about a change, in the recorded autofocus control, due to the automatic control of the action of the imaging apparatus 101 at the time of the trace recording is not played back, and the autofocus control is automatically performed again at the time of the trace playback. The settings of the toggle buttons 1303 to 1305 are applied to the imaging apparatus 101 from the terminal apparatus 102. Thus, an optimum operation according to the imaging environment is enabled by the user being allowed to select the control method.

Figure 14:
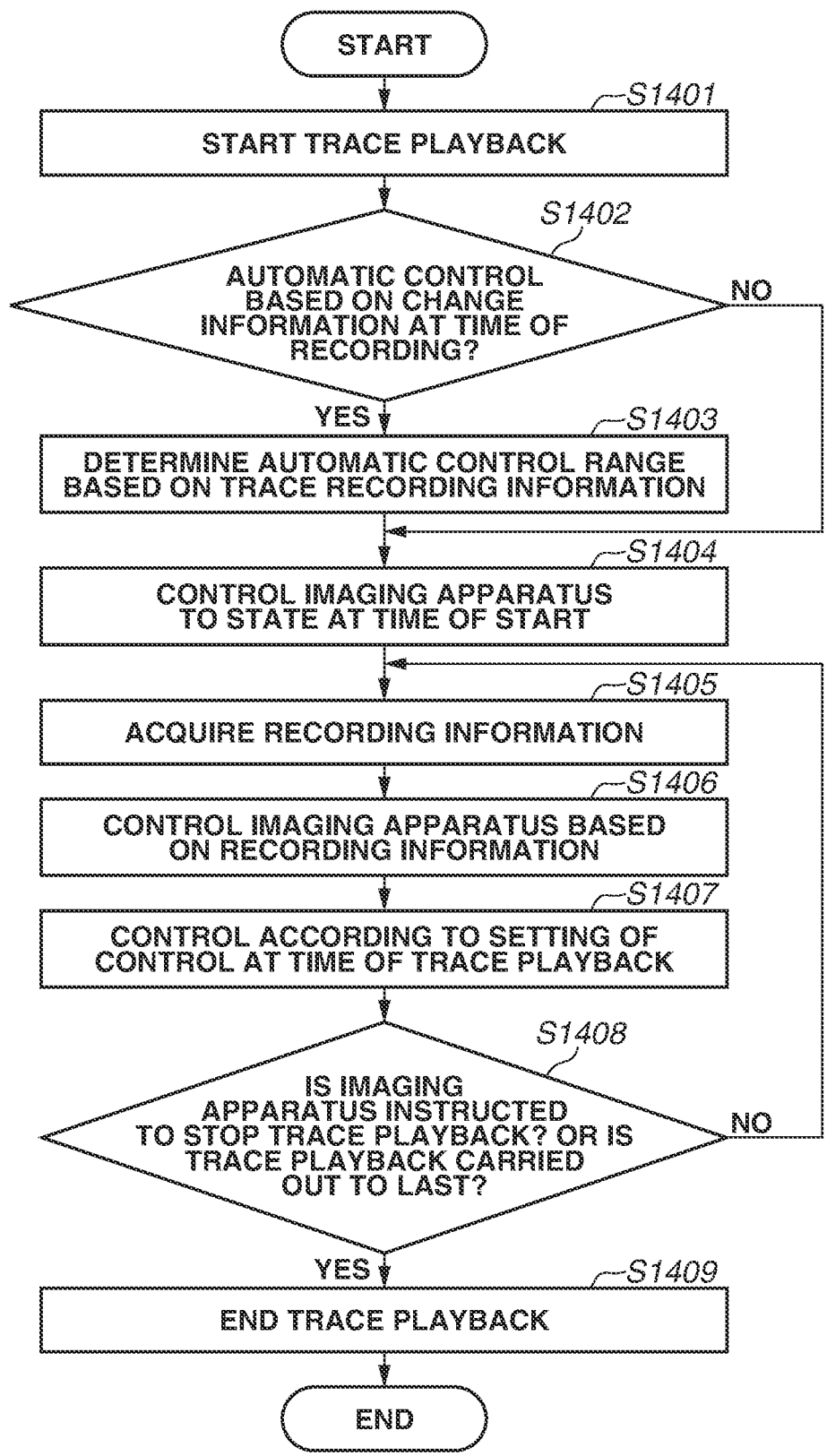
FIG. 14 illustrates a flowchart for control at the time of the trace playback.

Now, a flowchart at the time of the trace playback to which the setting of the control at the time of the trace playback according to the present exemplary modification is added will be described with reference to FIG. 14. Detailed descriptions of portions overlapping FIG. 11 will be omitted here.

Initially, the operation in step S1401 is similar to that in step S1101, and the imaging apparatus 101 starts the trace playback according to an instruction from the client apparatus. Subsequently, in step S1402, the system control unit 201 acquires the information set via the setting of the control at the time of the trace playback 1302. If the toggle button 1304 is set (YES in step S1402), the processing proceeds to step S1403. If another setting is selected (NO in step S1402), the processing proceeds to step S1404. In step S1403, the image processing unit 203 acquires, for example, the WB gain change amount as in the example described in the second exemplary modification from the trace recording information, and determines the control range at the time of the automatic control. The operations in steps S1404 to S1406 are similar to those in steps S1103 to S1105, and the system control unit 201 controls the imaging apparatus 101 to the initial position of the trace playback and acquires the next trace recording information from the storage unit 210. The imaging apparatus 101 is controlled to reproduce the user operation based on the recording information acquired in step S1405. Next, in step S1407, the system control unit 201 controls the camera according to the setting set via the setting at the portion of the "control at the time of the trace playback" 1302.

Figure 15:
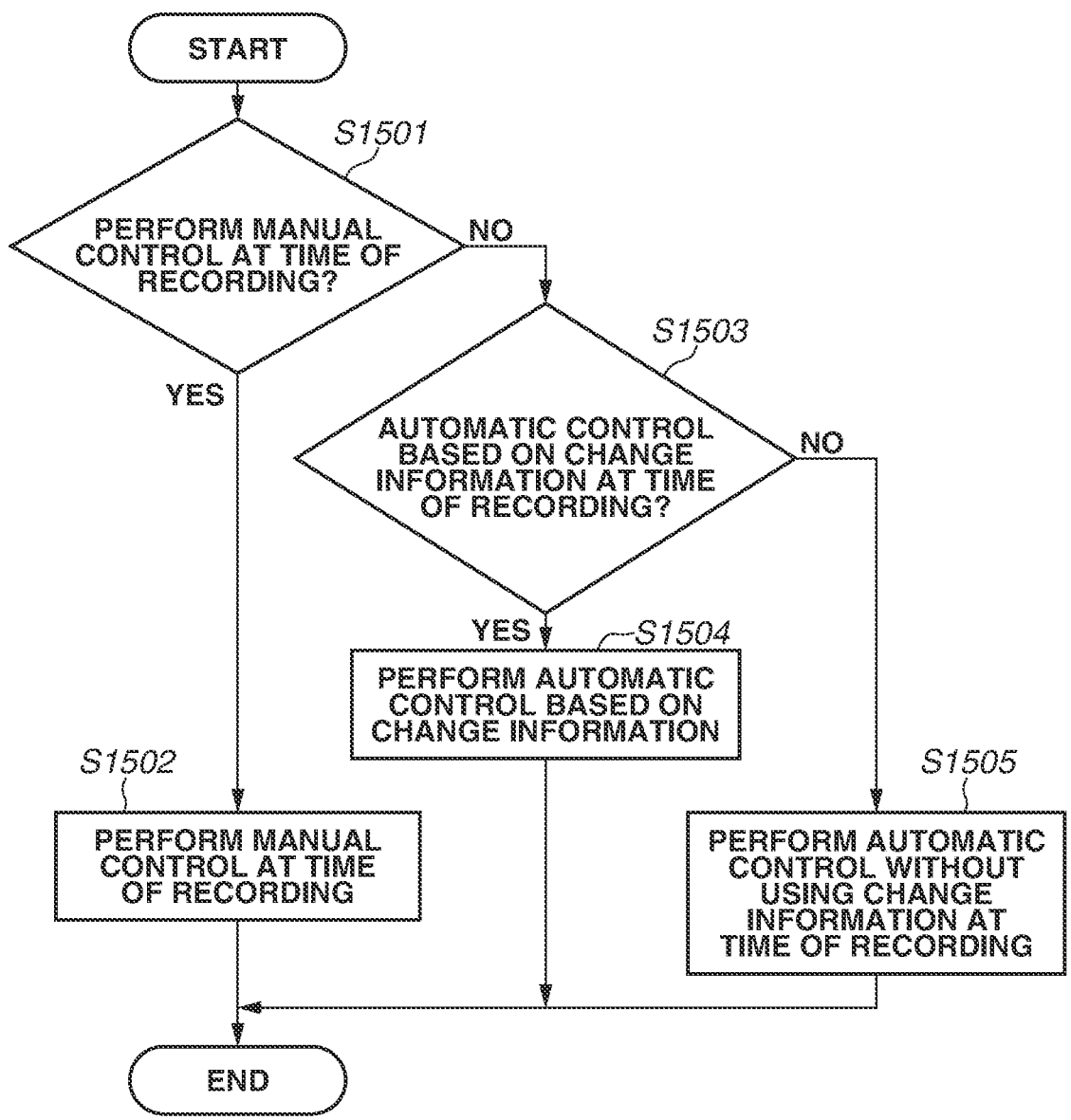
FIG. 15 illustrates a flowchart for control according to a setting of control at the time of the trace playback.

Now, the camera control according to the setting of the control at the time of the trace playback in step S1407 will be described with reference to a flowchart illustrated in FIG. 15. The system control unit 201 of the imaging apparatus 101 acquires the information set via the setting of the control at the time of the trace playback 1302 and switches the control according to the setting state. In step S1501, the system control unit 201 checks whether the setting of the control at the time of the trace playback 1302 is the state in which the toggle button 1303 is selected. If the toggle button 1303 is selected (YES in step S1501), the processing proceeds to step S1502. If the toggle button 1303 is not selected (NO in step S1501), the processing proceeds to step S1503. In step S1502, the system control unit 201 performs the processing for playing back the operation information recorded at the time of the trace recording. In step S1503, the system control unit 201 checks whether the setting of the control at the time of the trace playback 1302 is the state in which the toggle button 1304 is selected. If the toggle button 1304 is selected (YES in step S1503), the processing proceeds to step S1504. If the toggle button 1304 is not selected (NO in step S1503), the processing proceeds to step S1505. In step S1504, the system control unit 201 performs, for example, the automatic control described in conjunction with FIG. 11 or the automatic control such as the focus control in the driving range based on the change information as in the control described in conjunction with FIG. 8. Then, the flow is ended. Lastly in step S1505, while playing back the operation information at the time of the trace recording, the system control unit 201 does not play back the parameter recorded as the information about a change due to the automatic control at the time of the trace recording and adjusts this parameter under automatic control again. For example, the operation information about the imaging range at the time of the trace recording is played back. By contrast, the recorded information about a change, in the autofocus control, due to the automatic control of the action of the imaging apparatus 101 at the time of the trace recording is not played back, and the autofocus control is automatically performed again at the time of the trace playback. The operations in steps S1408 and S1409 are similar to those in steps S1107 and S1108, and thus, the descriptions thereof will be omitted here.

In the above-described manner, this processing enables the trace playback to be carried out according to the mode selected by the user among a plurality of modes regarding the trace playback, thus adaptively achieving the trace playback intended by the user.

OTHER EXEMPLARY EMBODIMENTS

The present disclosure can also be realized by processing that supplies a program capable of fulfilling one or more functions of the above-described exemplary embodiment to a system or an apparatus via a network or a recording medium, and causes one or more processors in a computer of this system or apparatus to read out and execute the program. The present disclosure can also be realized by a circuit (e.g., an application specific integrated circuit (ASIC)) capable of fulfilling one or more functions.

According to each of the above-described exemplary embodiments, it becomes possible to reproduce the previously performed action later in a further desirable manner even under a situation that the action regarding imaging is automatically controlled.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-110503, filed Jul. 2, 2021, which is hereby incorporated by reference herein in its entirety.

What is claimed is:

1. An imaging apparatus comprising,
    a processor executing instructions that, when executed, cause the processor to function as;
    a first control unit configured to control an action regarding an imaging unit according to an instruction from a user;
    a second control unit configured to automatically control an action regarding the imaging unit based on a preset condition;
    a first recording unit configured to chronologically record, as first information, details of the control of the action of the imaging unit according to the instruction from the user;
    a second recording unit configured to chronologically record, as second information, details of the automatic control of the action of the imaging unit based on the condition, in association with the first information; and
    a playback unit configured to play back chronological details of the control of the action of the imaging unit based on the first information and the second information.

2. The imaging apparatus according to claim 1, wherein the second control unit automatically controls an action regarding at least any one of conditions for focus, an aperture value, a shutter speed, a gain, an neutral density (ND) filter, white balance, a noise reduction, and gamma control, as the action regarding the imaging by the imaging unit.

3. The imaging apparatus according to claim 2, wherein the second control unit performs at least autofocus control of automatically controlling a focus position, as the action regarding the imaging by the imaging unit,
    wherein the second recording unit includes, in the second information, information about a change in the focus position in a case where at least the autofocus control is performed, and
    wherein the focus position is controlled based on the information about the change in the focus position included in the second information, at the time of the playback of the details of the control of the action of the imaging unit.

4. The imaging apparatus according to claim 3, wherein a range in which the focus position is searched for is limited based on the information about the change in the focus position included in the second information at the time of the playback of the details of the control of the action of the imaging unit.

5. The imaging apparatus according to claim 4, wherein the range in which the focus position is searched for is determined based on at least any one of a size of a subject, a distance to the subject, and a driving range regarding the control of the focus position at the time of the recording of the second information.

6. The imaging apparatus according to claim 1, wherein the instruction further causes the processor to function as an update unit configured to update the recorded second information,
wherein the playback unit plays back the chronological details of the control of the action of the imaging unit based on the updated second information.

7. The imaging apparatus according to claim 6, wherein the instruction further causes the processor to function as an output unit configured to present, to the user, information about the details of the automatic control of the action of the imaging unit based on the condition based on the recorded second information; and
an input unit configured to receive an instruction from the user,
wherein the update unit updates the second information according to the instruction from the user that is received by the input unit.

8. The imaging apparatus according to claim 6, wherein the update unit updates the second information by correcting, based on a preset condition, the details of the control of the action regarding the imaging by the imaging unit, the second information having been recorded as the second information.

9. The imaging apparatus according to claim 1,
wherein the first information recorded by the first recording unit includes information about a white balance gain, and
wherein the playback unit performs white balance control based on the information about the white balance gain.

10. The imaging apparatus according to claim 9, wherein the playback unit limits an effective range of automatic white balance based on the information about the white balance gain.

11. The imaging apparatus according to claim 10, wherein the effective range is determined based on the information about the white balance gain recorded by the first recording unit.

12. A control method for an imaging apparatus, the control method comprising:
controlling, as a first control, an action regarding an imaging unit according to an instruction from a user;
automatically controlling, as a second control, an action regarding the imaging unit based on a preset condition;
chronologically recording, as a first recording, details of the control of the action of the imaging unit according to the instruction from the user, as first information;
chronologically recording, as a second recording, details of the automatic control of the action of the imaging unit based on the condition, in association with the first information, as second information; and
playing back chronological details of the control of the action of the imaging unit based on the first information and the second information.

13. A non-transitory computer readable storage medium storing a program that causes a computer to execute a method, the method comprising:
controlling, as a first control, an action regarding an imaging unit according to an instruction from a user;
automatically controlling, as a second control, an action regarding the imaging unit based on a preset condition;
chronologically recording, as first information, details of control of the action regarding the imaging unit according to the instruction from a user;
chronologically recording, as second information, details of automatic control of the action regarding the imaging unit based on the preset condition, in association with the first information; and
playing back chronological details of the control of the action of the imaging unit based on the first information and the second information.

* * * * *